United States Patent [19]
Morimura et al.

[11] Patent Number: 6,072,474
[45] Date of Patent: Jun. 6, 2000

[54] DOCUMENT PROCESSING DEVICE

[75] Inventors: Takeshi Morimura; Tadashi Watanabe; Yuichi Fukui, all of Yamatokoriyama, Japan

[73] Assignee: Sharp Kabushiki Kaisha, Osaka, Japan

[21] Appl. No.: 08/674,108

[22] Filed: Jul. 3, 1996

[30] Foreign Application Priority Data

Aug. 11, 1995 [JP] Japan ..................................... 7-205770
Sep. 25, 1995 [JP] Japan ..................................... 7-245971

[51] Int. Cl.⁷ ........................................................ G09G 5/00
[52] U.S. Cl. ............................ 345/173; 345/174; 345/179
[58] Field of Search .................................... 345/173, 174, 345/175, 176, 177, 179

[56] References Cited

U.S. PATENT DOCUMENTS

| | | | |
|---|---|---|---|
| 4,389,711 | 6/1983 | Hotta et al. ............................. | 364/556 |
| 4,395,920 | 8/1983 | Kurtin et al. ......................... | 73/862.64 |
| 5,134,388 | 7/1992 | Murakami ............................... | 345/173 |
| 5,280,275 | 1/1994 | Kaplan ................................... | 345/157 |
| 5,298,672 | 3/1994 | Gallitzendorfer ....................... | 84/603 |
| 5,347,589 | 9/1994 | Meeks et al. ........................... | 382/3 |
| 5,483,261 | 1/1996 | Yasutake ................................ | 345/173 |
| 5,635,683 | 6/1997 | McDermott et al. .................... | 345/179 |

FOREIGN PATENT DOCUMENTS

| | | |
|---|---|---|
| 0434086 | 6/1991 | European Pat. Off. . |
| 0440364 | 8/1991 | European Pat. Off. . |
| 0441496 | 8/1991 | European Pat. Off. . |
| 0551778 | 7/1993 | European Pat. Off. . |
| 0585944 | 3/1994 | European Pat. Off. . |
| 0595746 | 5/1994 | European Pat. Off. . |
| 6342336 | 12/1994 | Japan . |

OTHER PUBLICATIONS

"Pressure–Sensitive Trackball Device," IBM Technical Disclosure Bulletin, vol. 38, No. 10, Oct. (1995) Armonk, NY, US.

"Pressure–Sensitive Mouse," IBM Technical Disclosure Bulletin, vol. 35, No. 6, Nov. 1992, Armonk, NY, US.

*Primary Examiner*—Matthew Luu

[57] ABSTRACT

When a user touches a tablet with a pen, a coordinate pointed with a nib of a pen and a tool force on this coordinate are detected, and a cursor is displayed at a position corresponding to the coordinate in a display device. Furthermore, the shape, color and size, etc., of the cursor can be varied according to a change in coordinate, tool force. This permits the user to recognize a level of the tool force which he actually applies at a glance. Additionally, an operational mode is switched according to an amount of change in detected coordinate and the tool force. As a result, the user is permitted to control an operational mode of the document processing device with ease only by a pen operation, thereby improving an operability.

18 Claims, 40 Drawing Sheets

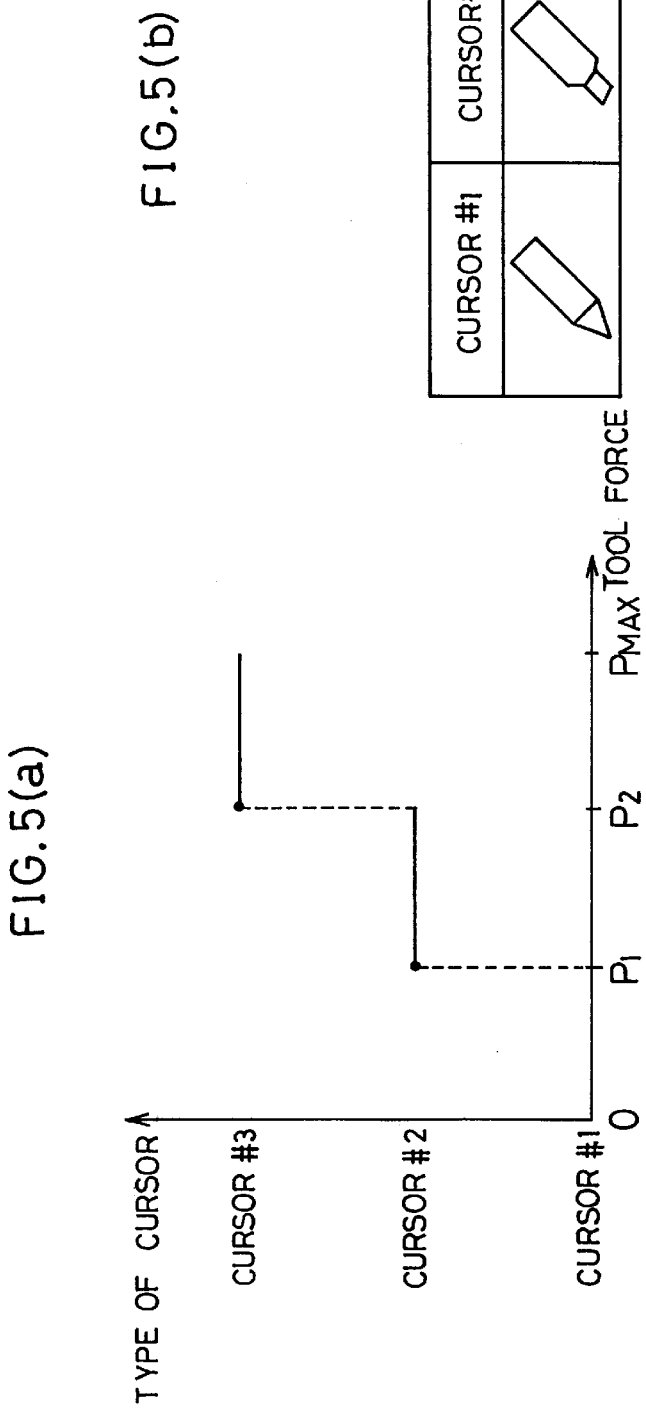

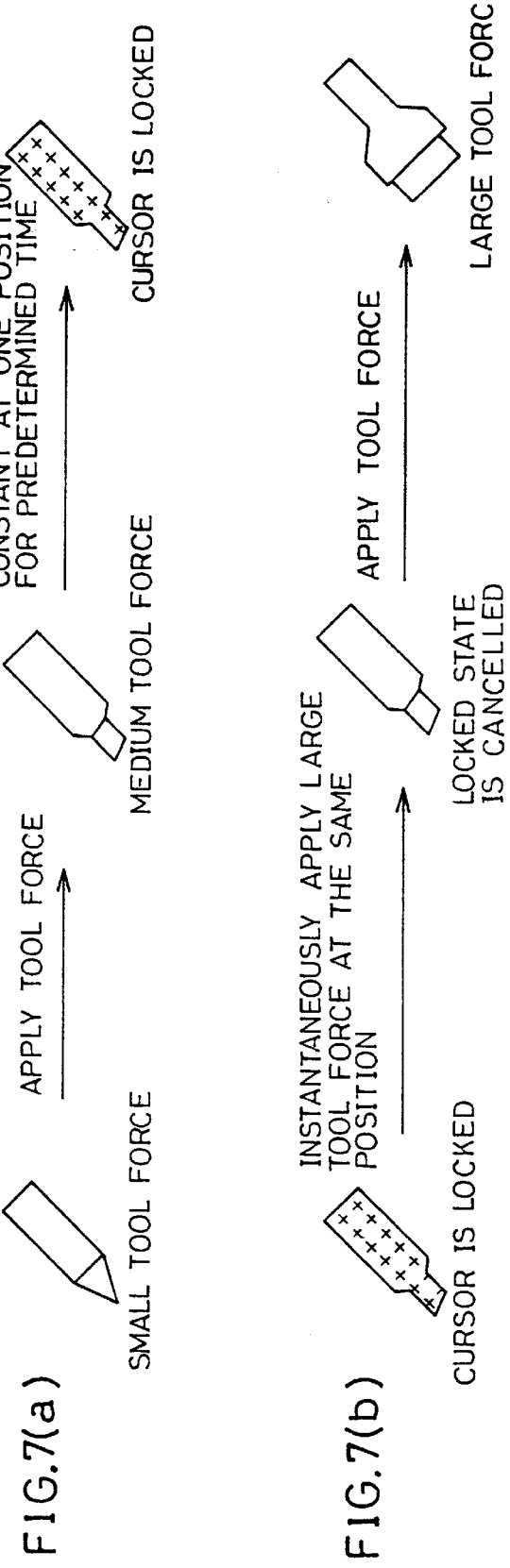

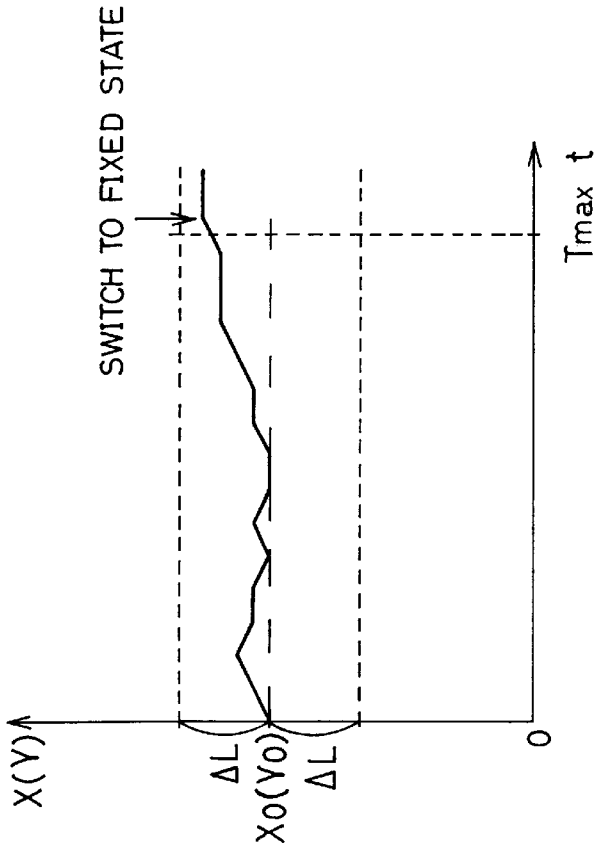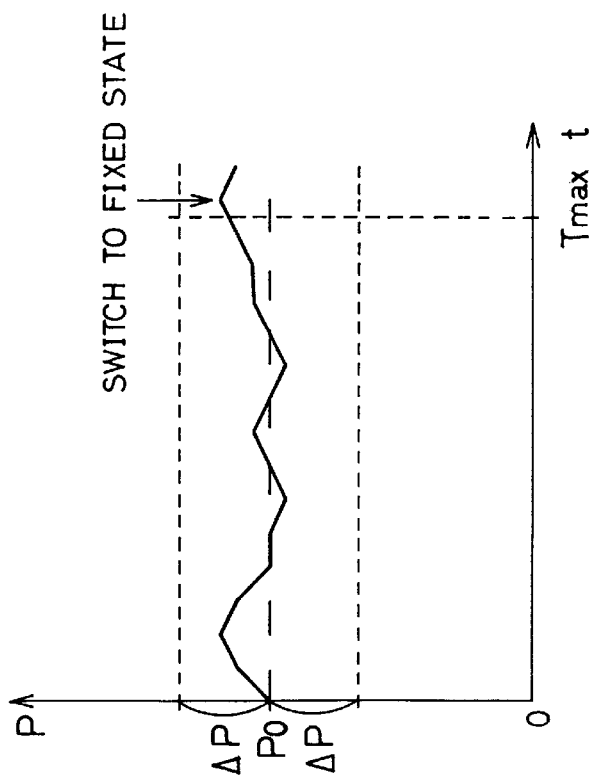
FIG.14 (a)
FIG.14 (b)

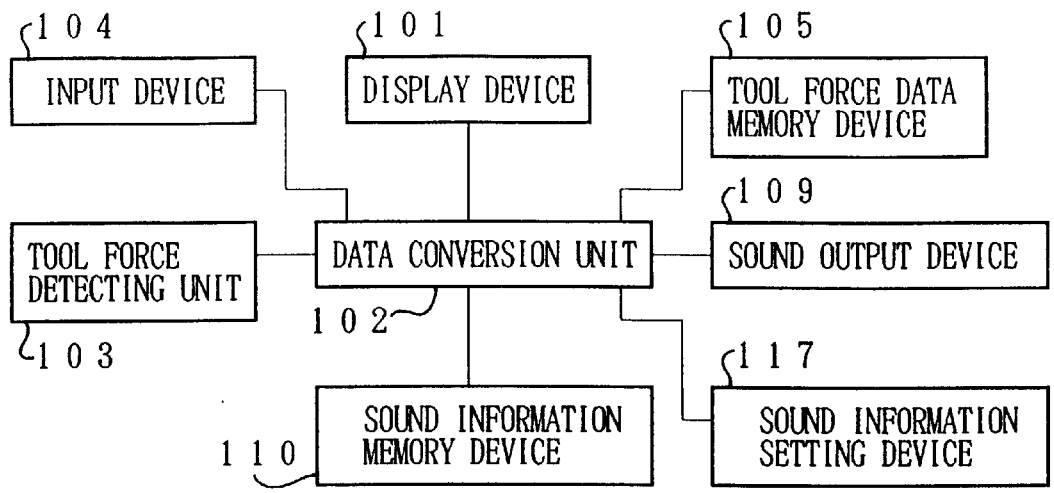
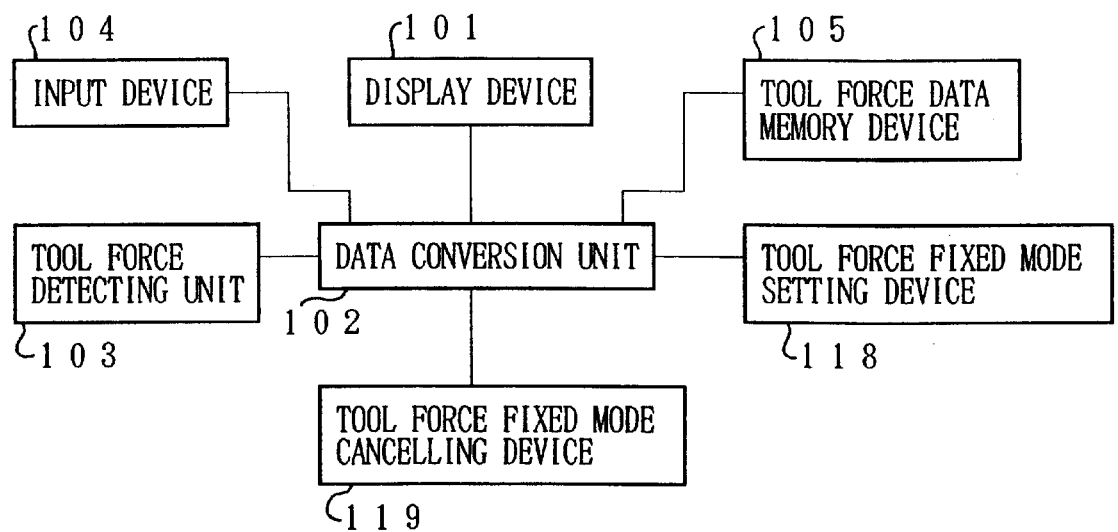

F I G. 4 2

```
┌─────────────────────────────────────────────┐
│            DISPLAY SCALE SETTING            │
├─────────────────────────────────────────────┤
│  SMALL           MEDIUM             LARGE   │
│  ┌─┬─┬─┬─┬─┬─┬─┬─┬─┬─┬─┬─┬─┬─┬─┬─┬─┬─┬─┐    │
│  └─┴─┴─┴─┴─┴─┴─┴─┴─┴─┴─┴─┴─┴─┴─┴─┴─┴─┴─┘    │
│                                             │
│  INPUT DISPLAY SCALE FOR FIRST LEVEL        │
│          FIRST LEVEL    _____         │
│          SECOND LEVEL   _____         │
│          THIRD LEVEL    _____         │
│                                             │
└─────────────────────────────────────────────┘
```

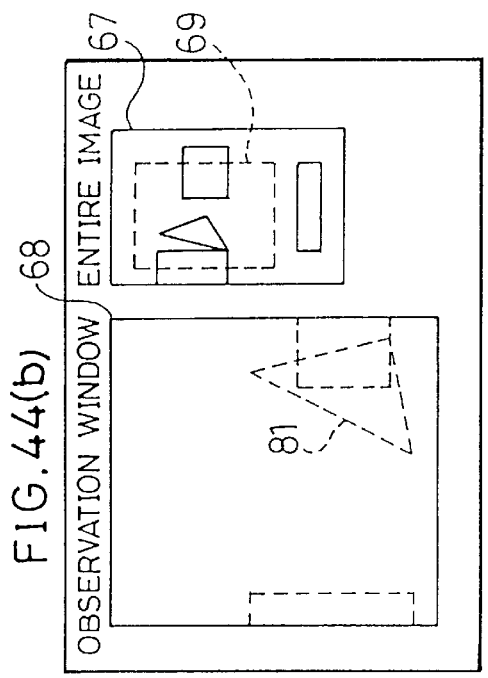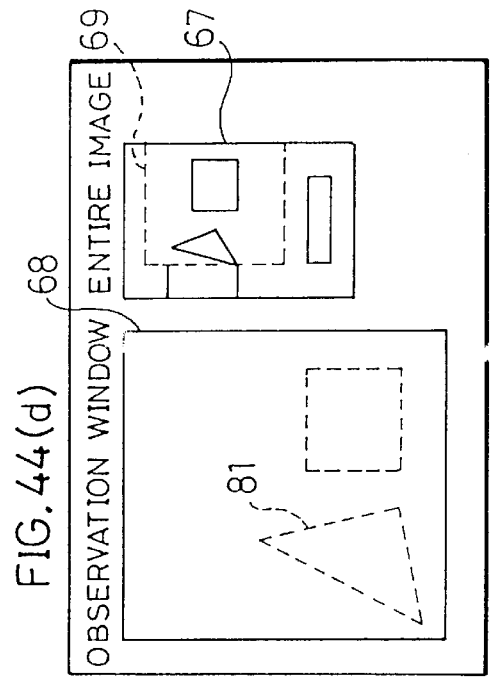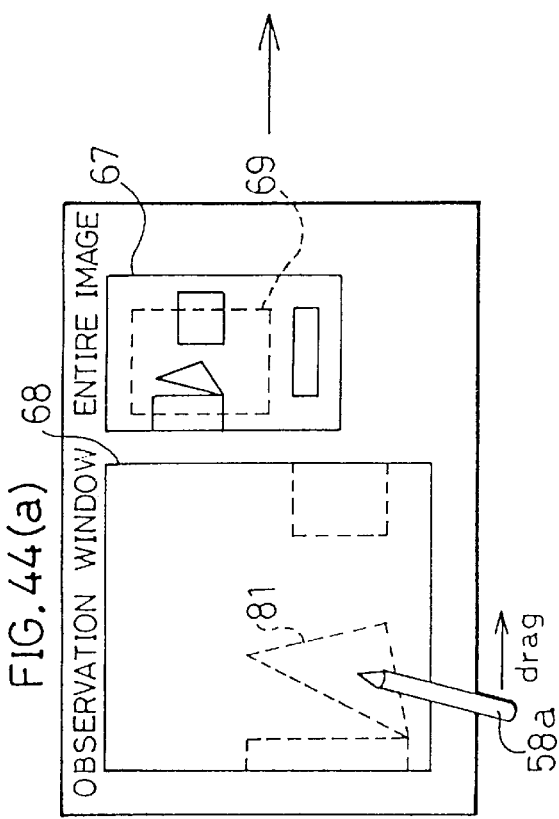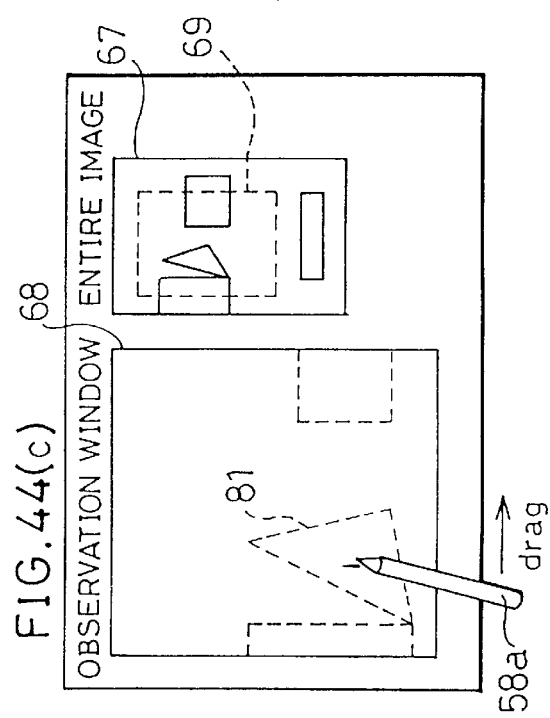

DOCUMENT PROCESSING DEVICE

FIELD OF THE INVENTION

The present invention relates to a document processing device such as a Japanese word processor, an alphanumeric word processor, a DTP (Desk Top Publishing) devise, a personal computer, etc., more particularly relates to a document processing device which permits a document or an image to be inputted or edited using a pen input interface that can detects a tool force.

BACKGROUND OF THE INVENTION

Recently, using word processors, personal computers, etc., plotting/editing of characters, images, etc., are permitted using a pen input interface such as a stylus pen, a tablet, etc., with simple and easy operation by means of a pen. However, most pen input interfaces available on the market do not have a tool force detecting function, and the effective use of the tool force detecting function has not yet been spread.

There are known techniques of varying a width of a line or a size of a dot for plotting based on a level of a tool force, and techniques of selecting an object to be edited based on a level of a tool force, etc. With the conventional techniques, the tool force is in proportion to the width of a line for plotting, and a plotting can be performed using a line of a variable width by adjusting a tool force.

Such conventional techniques are known, for example, from Japanese Laid-Open Patent Application No. 279980/1992 (Tokukaihei 4-279980) wherein a plurality of different objects or windows are selected based on a level of tool force detected by a tool force detecting device. In the device of this citation, an image is plotted by controlling a transmissivity to color used in plotting based on a level of a tool force, a mixed ratio of a color used in a background to a color used in plotting an image is adjusted to form a natural image like a recoating in a watercolor painting.

Another technique is disclosed in Japanese Laid-Open Patent Application No. 282094/1993 (Tokukaihei 5-282094), wherein a handwritten input can be made as if human being actually plots a line or a point by varying a width of a line or a size of a dot according to the level of tool force.

A still another technique is disclosed in Japanese Laid-Open Patent Application No. 195938/1983 (Tokukaisho 58-195938), wherein an expanded information can be inputted according to the tool force. In the arrangement of this citation, the user can lock the expansion when the information is displayed in a desired enlarged scale by applying a tool force to a light pen while observing a screen on the CRT. Additionally, a circle can be plotted by inputting a radius and a center of the circle by specifying a compass.

However, none of the above-described citations disclose a technique of instantaneously confirming the level of the tool force being applied by the user with a pen. Namely, the conventional document processing devices require a resulting plotting of a line by moving the pen to be determined based on the thickness of the line, and also requires the level of the tool force to be adjusted manually. On the other hand, Japanese Laid-Open Patent Application No. 195319/1992 (Tokukaihei 4-195319) discloses a light emitting display section for informing a state of a tool force based on a brightness. However, the citation does not provide a sufficient solution to recognize a tool force during a plotting operation performed by the user.

Besides, according to the described arrangement, when the user does not wish to vary the width of the line, etc., according to the level of the tool force, it is required to switch an operable mode between a mode in which a tool force is detected and a mode in which a tool force is not detected. To perform such switching of the operational mode, a troublesome operation is required, such as removing a pen from the current position to select a menu or an icon, etc. Moreover, Japanese Laid-Open Patent Application No. 195938/1983 (Tokukaisho 58-195938) fails to disclose operation means for locking the expansion in a desired enlarged scale. Such operation means is obtainable with ease, for example, by forming a lock instruction key on the keyboard, or forming a switch attached to a pen, etc. In the former case; however, it is required to operate a key on the keyboard with a hand which does not hold a pen as the other hand is occupied with the pen, thereby presenting a drawback of low operability. On the other hand, when adopting the latter case, a cost of manufacturing the device would be increased.

Additionally, there are known editing technique based on borders such as an image border, a graphic border, a character border, etc. However, the technique of scaling such borders as a whole has not yet been proposed. For example, although Japanese Laid-Open Patent Application No. 119415/1991 (Tokukaisho 3-119415) teaches the arrangement for scaling graphics, the technique adopted therein is not based on borders.

SUMMARY OF THE INVENTION

An object of the present invention is to provide a document processing device wherein characters, graphics, etc., are inputted by a user by means of a pen, which permits a control of various types of operations only by adjusting a tool force applied by the user.

To fulfill the above object, the document processing apparatus in accordance with the present invention is characterized by including:

pointing means for allowing a user to specify a coordinate by applying thereon a tool force;

coordinate detection means for detecting a coordinate specified by the pointing means;

tool force detection means for detecting a tool force at a time the coordinate is specified;

display means; and cursor display means for displaying a cursor in the display means, wherein the cursor display means displays a cursor in the display means at a position corresponding to a coordinate detected by the coordinate detection means based on a tool force detected by the tool force detection means.

According to the described arrangement, a cursor in accordance with the level of the tool force applied by the user is displayed. Therefore, the user can recognize the level of the tool force being applied at a glance, thereby permitting the adjustment of the tool force with ease, thereby improving an operability of the document processing device.

It may be arranged so as to display an indicator indicative of a level of the tool force applied by the user. This permits the user to more clearly recognize the level of the tool force being applied and a change in the level of the tool force.

To fulfill the aforementioned object, another document processing device in accordance with the present invention is characterized by including:

pointing means for allowing a user to specify a coordinate by applying thereon a tool force;

coordinate detection means for detecting a coordinate specified by the pointing means;

tool force detection means for detecting a tool force at a time the coordinate is specified;

display means; and plotting means for plotting an image in the display means at a position corresponding to a coordinate detected by the coordinate detection means, wherein an operational mode of the plotting means is switchable between a variable mode in which a plotting process is performed according to a tool force detected by the tool force detection means and a fixed mode in which a plotting process is performed according to a predetermined constant tool force, and the operational mode of the plotting means is switched between the variable mode and the fixed mode based on a change in at least one of the coordinate detected by the coordinate detection means and the tool force detected by the tool force detection means.

According to the described arrangement, an operational mode of the document processing device can be switched only by adjusting an amount of movement of the specifying means and a current level of the tool force. Therefore, the described feature permits the user to adjust the tool force while plotting characters, graphics, etc., by utilizing the specifying means which actually serves like a real pen, thereby improving an operability of the document processing device.

To fulfill the aforementioned object, a still another document processing apparatus in accordance with the present invention is characterized by including:

pointing means for allowing a user to specify a coordinate by applying thereon a tool force;

coordinate detection means for detecting a coordinate specified by the pointing means;

tool force detection means for detecting a tool force at a time the coordinate is specified;

display means; and graphic border control means for scaling a graphic border in the display means in accordance with a change in tool force when a coordinate detected by the coordinate detection means is on the graphic border.

The described arrangement permits a scaling of the graphic border with a simple operation of only adjusting a tool force while specifying the graphic border, thereby achieving an improved operability.

The novel features which are considered as characteristic of the invention are set forth in particular in the appended claims. The improved treatment method, as well as the construction and mode of operation of the improved treatment apparatus, will, however, be best understood upon perusal of the following detailed description of certain specific embodiments when read in conjunction with the accompanying drawings.

BRIEF DESCRIPTION OF THE DRAWINGS

FIG. 5(a) is an explanatory view showing the case where a tool force is divided into three levels.

FIG. 5(b) is an explanatory view showing an example of a bit map of a cursor, to be set according to the level of a tool force.

FIG. 7(a) and FIG. 7(b) are explanatory views showing a state where a cursor on a display varies in accordance with a tool force.

FIG. 14(a) and FIG. 14(b) are graphs respectively showing examples of changes in tool force and coordinate when an operational mode is switched from a variable mode to a fixed mode.

FIG. 20 through FIG. 31 are block diagrams showing schematic structures of a document processing device in accordance with another embodiment of the present invention and modifications thereof.

FIG. 42 is an explanatory view showing one example of a scale display setting screen to be displayed when setting a display scale of the indicator by the user.

FIGS. 44($a$) and 44($b$) are an explanatory view showing a case where only a graphic border is scrolled within an observation window.

FIGS. 44($c$) and 44($d$) are an explanatory view showing the state where the area displayed in the observation window is scrolled.

DESCRIPTION OF THE EMBODIMENTS

First Embodiment

The following descriptions will discuss one embodiment of the present invention in reference to FIG. 1 through FIG. 19.

Figure 1:
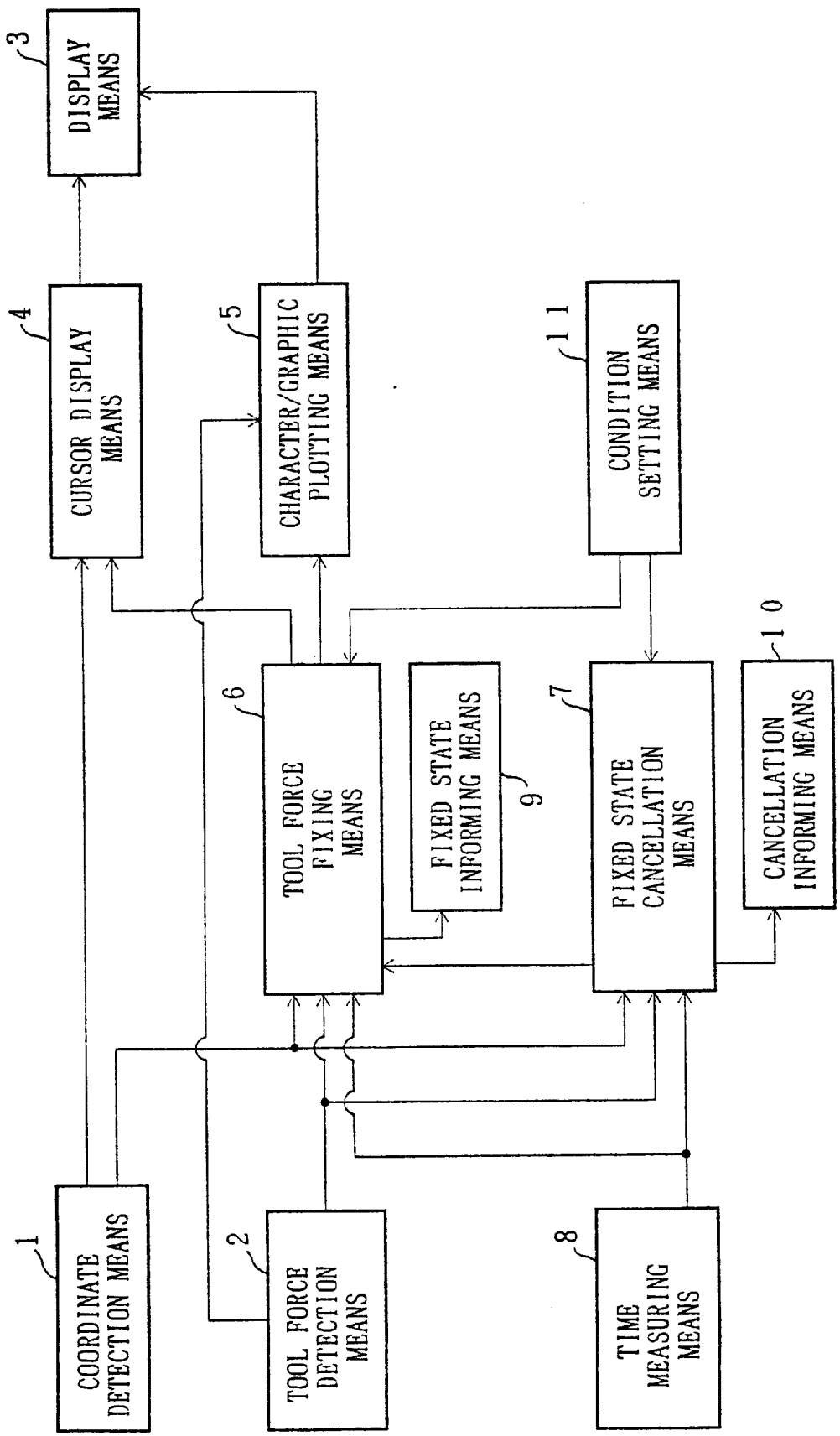
FIG. 1 is a block diagram showing a schematic structure of a document processing device in accordance with one embodiment of the present invention.
Figure 2:
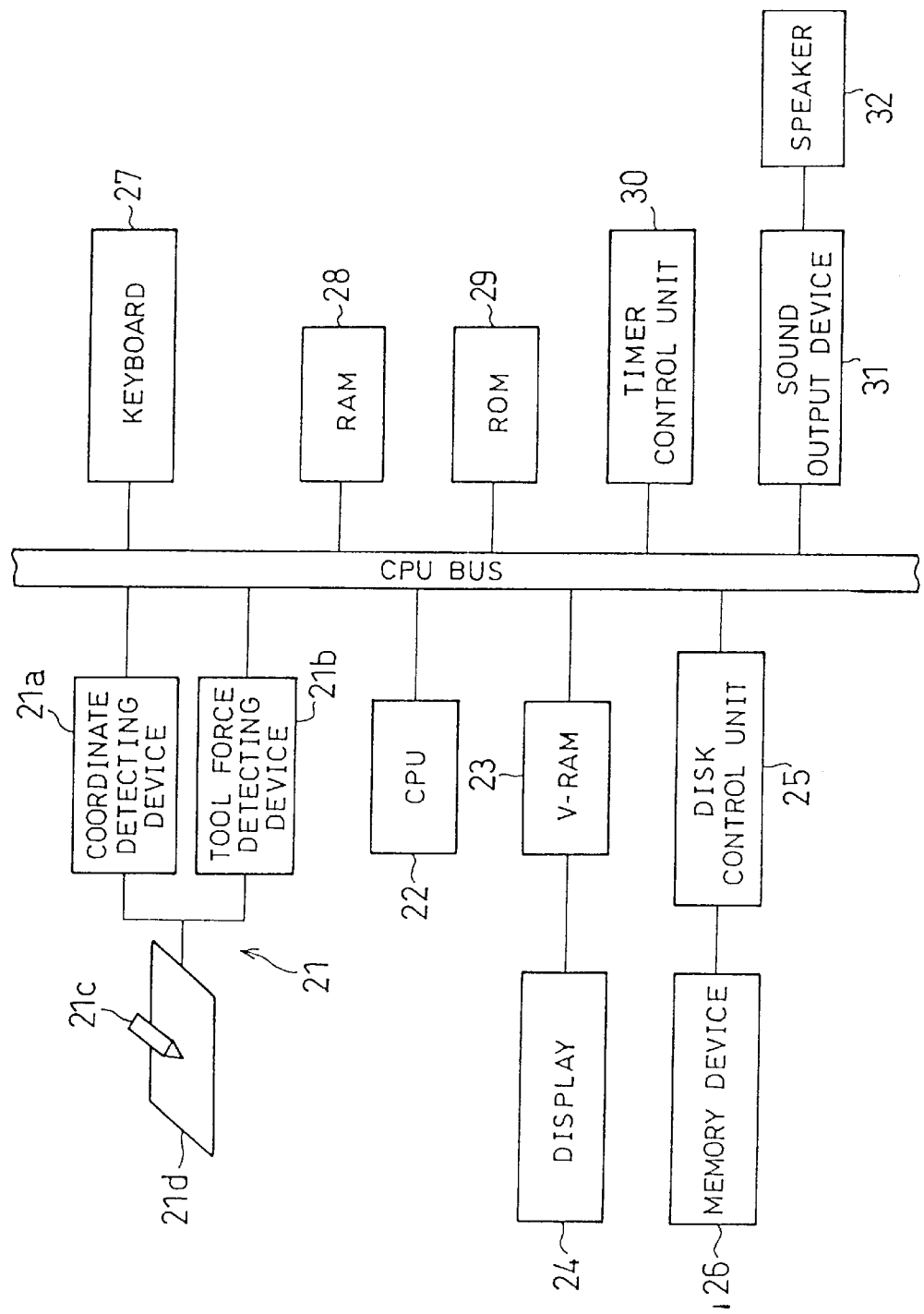
FIG. 2 is a block diagram showing a more detailed structure as an example of the document processing device of FIG. 1.

FIG. 2 is a view showing a structure of a document processing device in accordance with the present embodiment of the present invention. A pen input device 21 provided in the document processing device includes a coordinate detecting device 21$a$, and a tool force detecting device 21$b$. When a user touches a tablet 21$d$ with a pen 21$c$, the coordinate corresponding to the position touched with the pen 21$c$ and the tool force on this occasion are detected. Here, the tool force indicates a force applied through by the pen 21$c$ exerted against the tablet 21$d$.

The document processing device also includes a CPU 22. The CPU 22 executes a program on a RAM 28 and a ROM 29, and performs various processes with respect to devices which are connected to a CPU bus. The CPU 22, for example, performs processes such as writing a plotting data on a video RAM (V-RAM) 23 (to be described later) based on information obtained from the pen input device 21.

The V-RAM 23 is a RAM for storing an image displayed on a display 24. The plotting data written on the V-RAM 23 is displayed on the display 24. The V-RAM 23 has addresses corresponding to the coordinates on the display 24, and the image data stored in certain address of the V-RAM 23 is displayed on the display 24 on a coordinate corresponding to the address.

The document processing device includes a disk control unit 25. The disk control unit 25 performs a control in reading and writing data with respect to a memory device 26 such as a hard disk, a floppy disk, etc. In the memory device 26, recorded are program, data to be controlled by the program, etc., which can be stored therein for a long period of time. A keyboard 27 is an input device for allowing the user to make a key input and to detect information corresponding assigned to the pressed key. The RAM 28 is a readable and writable memory, and the ROM 29 is a read only memory. Both the RAM 28 and the ROM 29 store program, data, etc., which are controlled directly by the CPU 22.

A timer control unit 30 is provided for controlling time, and for measuring an elapsed time. A sound output device 31 controls a speaker 32 to beep.

Figure 3:
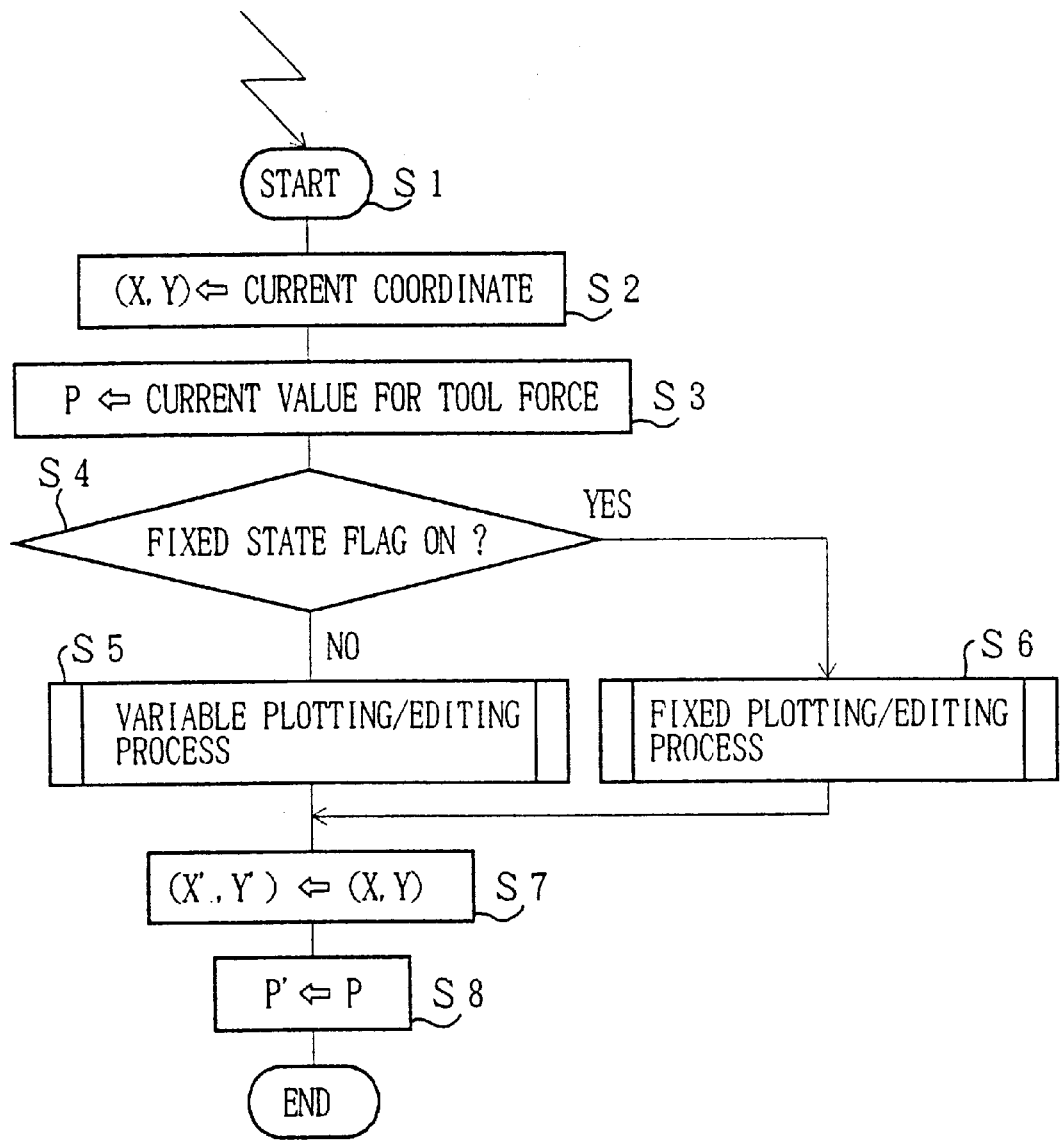
FIG. 3 is a flowchart showing a main routine to be executed by the document processing device.

Next, an operation of the document processing device will be explained. FIG. 3 is a flowchart of a main routine to be executed by the document processing device under a control of the CPU 22. The main routine starts at every occurrence of the pen event occurred by an operation with the pen 21$c$ performed by the user (S1). The pen event can be classified into three types: pen down occurred when the tablet 21$d$ is touched with a pen, pen drag occurred when the pen 21$c$ is moved without losing a contact with the tablet 21$d$, and pen up occurred when the pen 21$c$ loses contact with the tablet 21$d$.

Respective timing of the occurrence of the described pen event are as follows. An event of the pen down occurs the moment the tablet 21$d$ is touched with the pen 21. An event of the pen drag occurs during a short interval in the drag (some millisecond order). An event of the pen up occurs the moment the pen 21$c$ loses contact with the tablet 21$d$.

First, the coordinate and the tool force at an occurrence of the pen event are respectively substituted for parameters (X, Y) and P (S2, S3). Such coordinate and the tool force are obtained in the form of numeral values by the coordinate detecting device 21$a$ and the tool force detecting device 21$b$. The parameters (X, Y) and the parameter P are stored in the RAM 28. The same can be said for respective parameters, flags, etc., to be described later.

Next, it is determined whether or not the fixed state flag is ON (S4), the process to be performed is branched into the variable plotting/editing process (S5) and the fixed plotting/editing process (S6) based on the result of S4. The fixed state flag indicates whether the current plotting or editing state with the pen 21$c$ is variable according to the tool force or fixed irrespectively of the tool force. The variable plotting/editing process and the fixed plotting/editing process will be described later in detail. Upon completing a plotting or editing, a current coordinate position (X, Y), and a tool force P are respectively substituted for variables (X', Y') and P' (S7, S8), thereby completing the main routine.

In the described document processing device, the CPU 22 is characterized in that a cursor is plotted in shape and/or size according to the tool force detected by the tool force detecting device 21$b$ in the display 24 at the position corresponding to the coordinate detected by the coordinate detecting device 21$a$. When the user plots a character or a graphic on the tablet 21$d$ by moving the pen 21$c$ while applying thereto a tool force, the locus is displayed on the display 24. This allows the user to input characters or graphics as if he actually draws characters or graphics with a pen. Additionally, the width of the line and the size of the dot to be displayed on the display 24 may be altered based on the tool force applied by the user (variable mode), or may be set constant irrespectively of the tool force applied by the user (fixed mode). Here, the described variable plotting/editing process is a process to be executed in the variable mode, and the fixed plotting/editing process is a process to be executed in the fixed mode.

The document processing device in accordance with the present embodiment may be arranged such that the CPU 22 plots a cursor on the display 24 in color, density, and brightness according to the tool force detected by the tool force detecting device 21b at a position corresponding to the coordinate detected by the coordinate detecting device 21a. Additionally, color, density, brightness, etc., of not only cursor but also line, etc., to be displayed on the display 24 can be varied according to the tool force.

The CPU 22 may be arranged so as to plot characters, graphics, etc., on the display 24 in size, color, density, brightness, etc., according to the tool force detected by the tool force detecting device 21b. On the other hand, in the case where an amount of change in tool force detected by the tool force detecting device 21b within a predetermined elapsed time measured by a timer control unit 30 is not more than a predetermined amount and an amount of change in coordinate detected by the coordinate detecting device 21a within a predetermined elapsed time measured by the timer control unit 30 is not more than a predetermined amount, characters, graphics, etc., can be plotted in size, color, density, brightness, etc., according to the fixed tool force.

Figure 4:
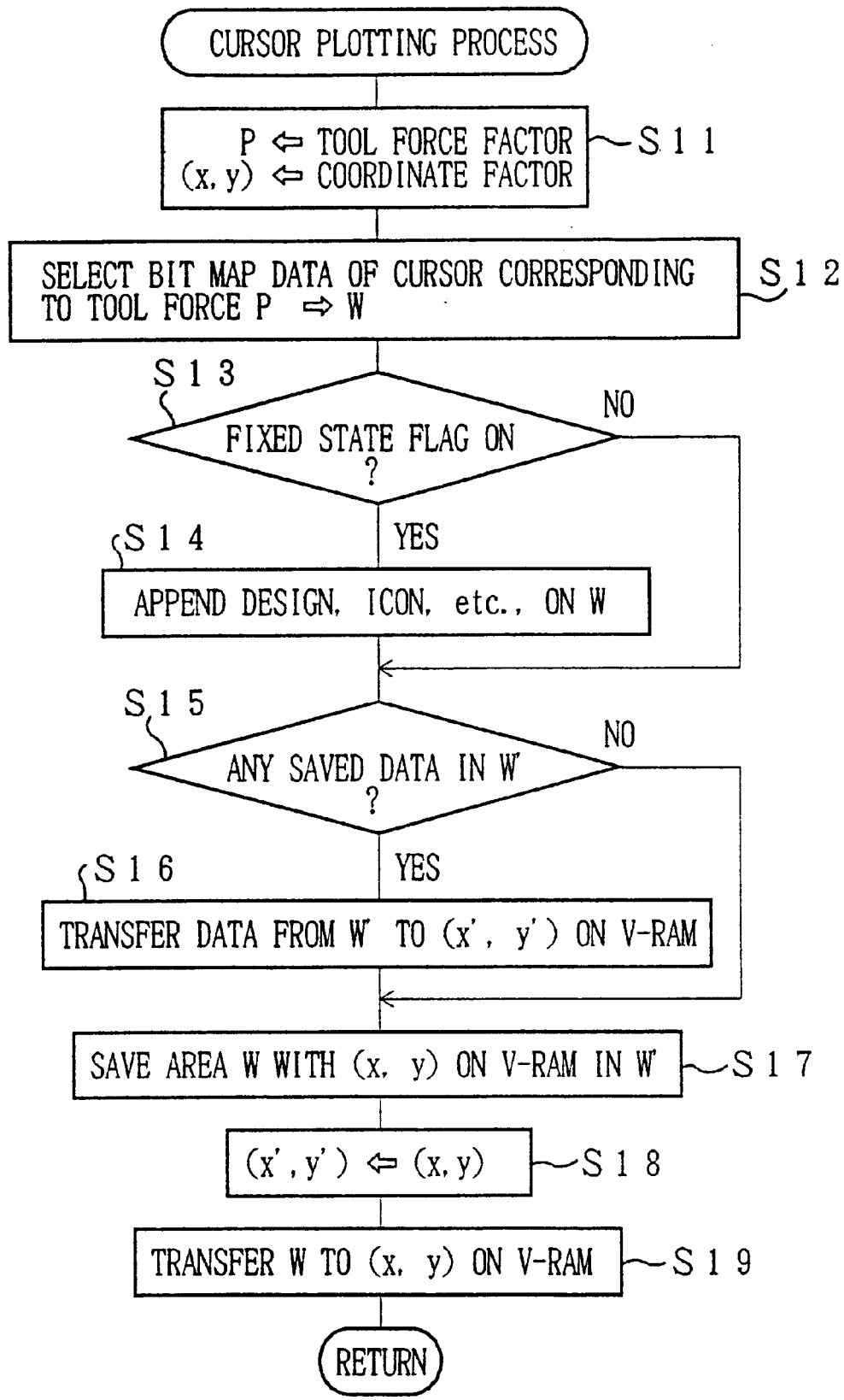
FIG. 4 is a flowchart showing a process of a cursor plotting executed by the document processing device.

FIG. 4 is a flowchart showing a routine of the cursor plotting process. The routine is called as a subroutine in the variable plotting/editing process (S5), or the fixed plotting/editing process (S6) in the main routine of FIG. 3, and when the subroutine is called, the tool force and the coordinate are passed as factors.

In the described routine, the tool force and the coordinate to be passed as factors are respectively substituted for variables p and (x, y) (S11). Next, the cursor is selected according to the value of p, and the bit map image of the selected cursor is developed into the work area W prepared on the RAM 28 (S12).

For example, as show n in FIG. 5(a), the tool force p is divided into ranges: $0<p \leq P_1$, $P_1<p \leq P_2$, $P_2<p \leq P_{MAX}$ ($P_{MAX}$ indicates a maximum value for the tool force) so that the cursor #1, the cursor #2, the cursor #3 respectively correspond thereto. For respective images of the cursors #1, #2 and #3, those which permit the user to recognize the current mode of plotting/editing at a glance are prepared. For example, when the width of the line to be plotted varies according to the tool force, as shown by FIG. 5(b), a bit map image that requires various types of nibs of pens such as a pencil, a marker, a paint brush, etc., are prepared. These bit map images are stored in either one of the RAM 28, the ROM 29 and the memory device 26. Further, the CPU 22 selects a bit map image of the cursor to be displayed according to the tool force p among them, and the selected bit map image is developed into the work area W on the RAM 28.

Figure 6B:
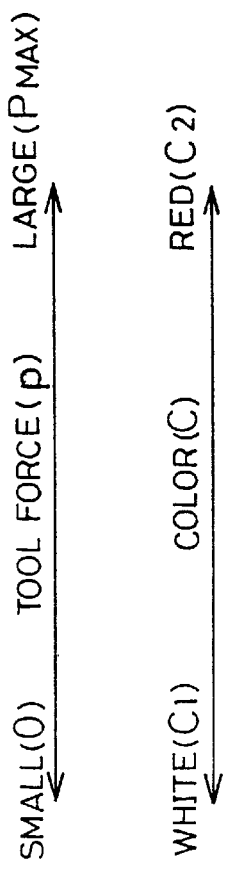
FIG. 6(b) is an explanatory view showing a state where a cursor is changed in accordance with a change in tool force.
Figure 6A:
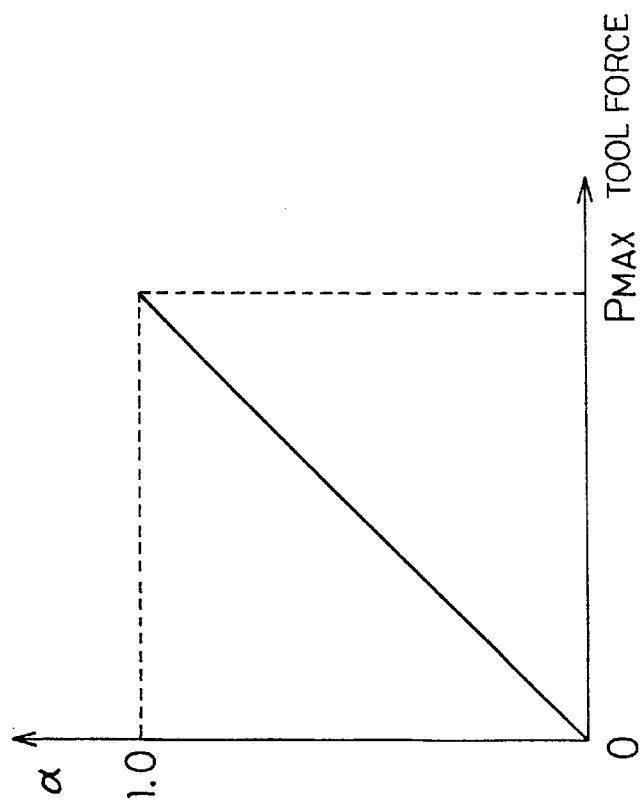
FIG. 6(a) is a graph showing a change in coefficient a against the tool force.

In the case of varying color, density, brightness, etc., of the cursor according to the tool force, as shown in FIG. 6(a), the tints and the brightness of color, and the mixed ratio of colors are varied based on $\alpha$ defined as $\alpha = p/P_{MAX}$ ($0 \leq p \leq P_{MAX}$). In the present embodiment, explanations will be given through the case where as the tool force p becomes greater, the color of the cursor gradually changes from white ($C_1$) to red ($C_2$). Assumed that when the tool force is 0, the color of the cursor be white ($C_1$), and the color when the tool force p is increased to $P_{MAX}$ be red ($C_2$), then the color C for coloring the cursor is defined by the formula:

$$C=(1-\alpha)C_1+\alpha C_2.$$

In S12 of FIG. 4, the bit map image of the cursor developed in the work area W on the RAM 28 is colored in color C. Here, the color C is expressed as a vector having respective independent components. However, as such components (for example, each component of RGB) can be selected as desired, the explanations thereof shall be omitted here. Additionally, the tints, brightness of color, etc., can be varied based on the above-defined $\alpha$.

As described, after selecting the bit map image of the cursor, the fixed state flag is referred to (S13), and when the flag is ON, a design, an icon, etc., are appended to the bit map image of the cursor being developed in the work area W. Hereinafter, the state where the design, icon, etc., are appended to the cursor is described as "The cursor is locked". With the appendage of the design, the icon, etc., the cursors in the same shape can be distinguished between the state where the fixed plotting/editing mode is ON and the state where the fixed mode is cancelled.

In the variable plotting/editing process (S5) and the fixed plotting/editing process (S6), the fixed state flag is switched between the ON position and the OFF position based on whether or not a specific condition is satisfied. in the variable plotting/editing process (the fixed state flag is OFF), as shown in FIG. 7(a), the cursor of the image plotted with a pencil is displayed when an applied tool force is small, and by increasing the applied tool force, the image of the cursor varies from the image with the pencil to the image with the marker. When the user maintains the pen 21c on the tablet 21d at the same position with the same applied tool force, the fixed state flag is switched ON, and the cursor is locked. Further, in the state where the cursor is locked, as shown in FIG. 7(a), the design is appended to the cursor. In this case, the conditions of switching the fixed state flag from the OFF state to the ON state are as follows: An amount of change in tool force detected by the tool force detecting device 21b is not more than a predetermined amount in a predetermined elapsed time measured by the timer control unit 30; and an amount of change in coordinate detected by the coordinate detecting device 21a is not more than a predetermined amount in a predetermined elapsed time measured by the timer control unit 30.

On the other hand, in the fixed plotting/editing process (the fixed state flag is ON), in the state where the cursor is locked, the fixed state flag is switched to the OFF position and the locked state of the cursor is cancelled when the following conditions are satisfied: An amount of change in tool force detected by the tool force detecting device 21b is not less than a predetermined amount in a predetermined elapsed time measured by the timer control unit 30; and an amount of change in coordinate detected by the coordinate detecting device 21a is not more than a predetermined amount in a predetermined elapsed time measured by the timer control unit 30. For example, in the state where the cursor is locked, when the user presses the pen 21c hard on the tablet 21d instantaneously, as shown in FIG. 7(b), the locked state of the cursor is cancelled, and the design appended to the image (marker) of the cursor disappears. Thereafter, as the fixed state flag is in the OFF position, the cursor plotting process and the cursor plotting/editing process are performed according to the tool force. Namely, when the tool force is increased, as shown in FIG. 7(b), the image of the cursor changes from the marker to the paint brush.

The process in and after S15 is the process of transferring data to the V-RAM 23 for plotting the cursor. First, it is determined whether or not there exists any saved data in the work area W' in the RAM 28 (S15). If there exists any saved data in S15, to delete the cursor displayed last time in the routine, the bit map data that is already saved is transferred from the work area W' to the coordinate (x', y') (S16). If there exists no data in the work area W', (if a cursor is displayed for the first time), the process in S16 is skipped.

Then, the work area W started with the coordinate (x, y) in the RAM 28 is stored in the work area W' started with the coordinate (x', y') (S17). Further, the coordinate (x, y) is stored in the coordinate (x', y') (S18). Next, the bit map of the cursor is transferred from the work area W of the RAM 28 to an address on the V-RAM 23 corresponding to the coordinate (x, y) (S19).

Next, the aforementioned variable plotting/editing process (S5 in FIG. 4) and fixed plotting/editing process (S6 in FIG. 4) will be explained. The variable plotting/editing process refers to the process wherein a type of plotting and an editing mode are varied based on the tool force. The fixed plotting/editing process refers to the process wherein a type of plotting and an editing mode are fixed irrespectively of a change in tool force.

In the variable plotting/editing process, characters or graphics are displayed on the display 24 in size, color, tint, brightness according to the tool force detected by the tool force detecting device 21b. In the variable plotting/editing process; however, the fixed state flag is switched from the OFF position to the ON position when the following conditions are satisfied: An amount of change in tool force detected by the tool force detecting device 21b is not more than a predetermined amount in a predetermined elapsed time; and an amount of change in coordinate detected by the coordinate detecting device 21a is not more than a predetermine amount in a predetermined elapsed time.

For example, as shown in FIG. 14(a), if an amount of change in tool force from $P_0$ is within $\Delta P$, and as shown in FIG. 14(b), an amount of change in coordinate from $(X_0, Y_0)$ respectively in an X-direction and a Y-direction are within $\Delta L$, the fixed state flag is switched from the OFF position to the ON position, wherein $P_0$, and $(X_0, Y_0)$ are a tool force and a coordinate respectively when the timer starts measuring an elapsed time. After the fixed state flag is switched to the ON position, the plotting/editing process is performed in the fixed mode wherein a type of plotting and an editing mode are fixed at constant tool force $P_0$ and the coordinate $(X_0, Y_0)$ irrespectively of the tool force.

Variable Plotting/Editing Process (1)

Figure 8:
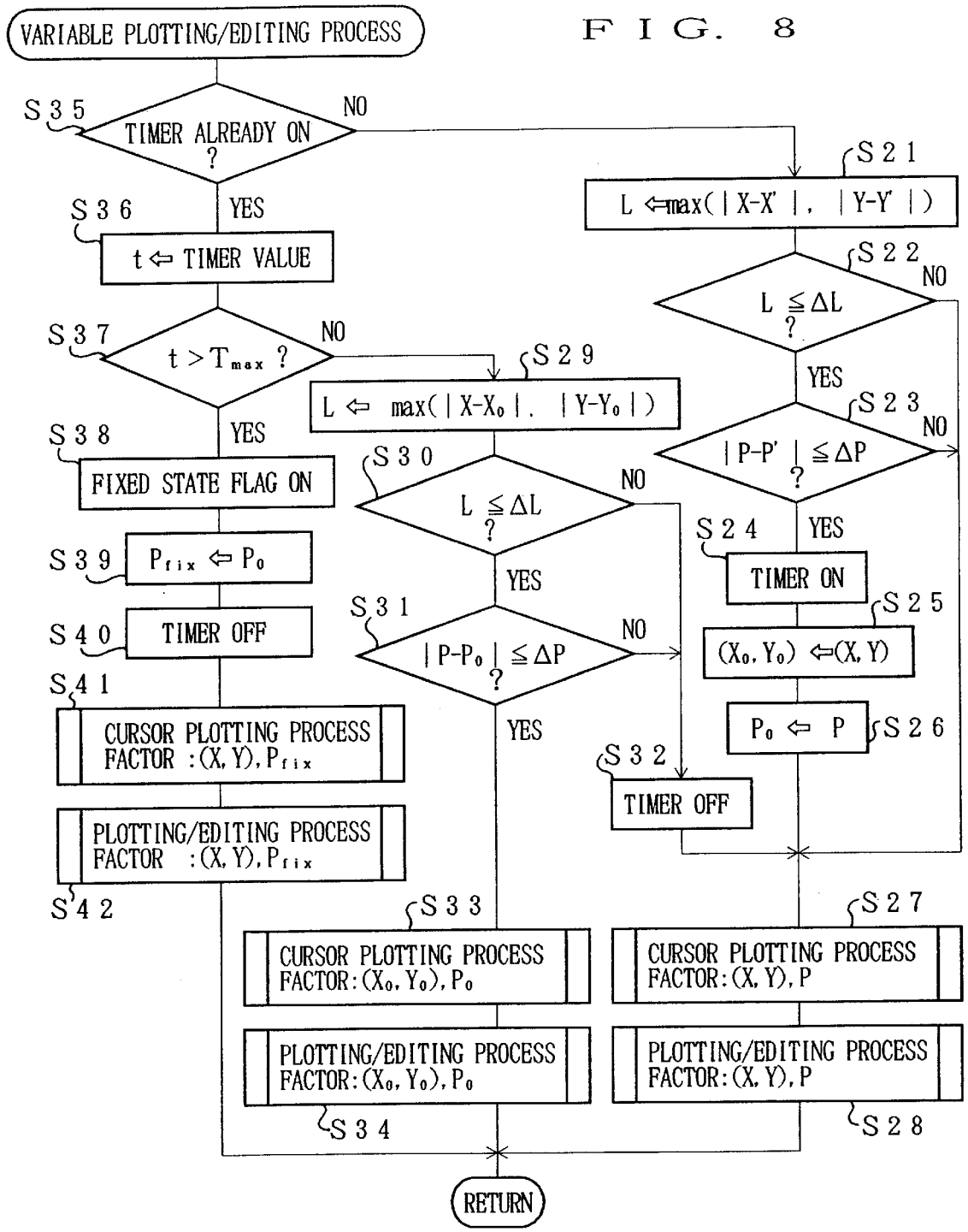
FIG. 8 is a flowchart showing an example of a variable plotting/editing process in a main routine shown in FIG. 3.

FIG. 8 is a flowchart showing one example of the variable plotting/editing process of S5 in the main routine. First, it is determined whether or not the measuring of an elapsed time has started (S35). Here, the elapsed time is measured by the timer control unit 30. If the result of determination in S35 is NO, the sequence moves to S21 where it is determined whether or not the measuring of time has started based on the current coordinate (X, Y) and the tool force P, and the coordinate (X', Y') and the tool force P' stored when the main routine executed previously.

Specifically, in S21, a maximum amount of change in coordinate from the previous coordinate position (X', Y') to the current coordinate position (X, Y) respectively in the X-direction and the Y-direction is calculated, and the resulting maximum value is defined as L. Namely, a max {A, B} in S21 is a function showing maximum value between A and B. Thereafter, in S22, it is determined whether or not L is within $\Delta L$. Further, in S23, it is determined whether or not an amount of change in tool force from the previous tool force P' to the current tool force P is within $\Delta P$.

If the result of determination in S22 or S23 is NO, the cursor plotting process, and plotting/editing process are performed based on the current tool force P and coordinate (X, Y), and the sequence returns to the main routine.

On the other hand, if the results of determinations are YES both in S22 and S23, the timer control unit 30 is set ON to initiate a measuring of an elapsed time (S24). Further, the current coordinate position (X, Y) and the tool force P are respectively substituted for the coordinate position $(X_0, Y_0)$ and the tool force $P_0$ at a start of measuring an elapsed time (S25, S26). Then, the processes in S27 and S28 are performed, and thereafter the sequence returns to the main routine.

In the cursor plotting process in S27, the coordinate (X, Y) and the tool force P are passed as factors to the aforementioned routine of FIG. 4, and a plotting of cursor is performed according to the passed coordinate and tool force. In the plotting/editing process, a plotting or editing operation is performed according to the coordinate and the tool force passed as the described factors, such as a process of varying a line width to be displayed on the display 24 according to the tool force. For the described plotting/editing process, a known technique is employed, and thus the detailed explanations thereof shall be omitted here. When the described routine is called again, as the timer is already set ON (YES in S35), the process in and after S36 is performed. First, in S36, the current elapsed time, i.e., the elapsed time after the timer is set ON (If YES in S35) is substituted for t. Next, in S37, t resulting from S36 is compared with $T_{max}$, and if $t \leq T_{max}$, the sequence moves to S29. Then, it is determined whether or not amounts of change in coordinate position from $(X_0, Y_0)$ at a start of measuring an elapsed time to the current coordinate position (X, Y) respectively in the X-direction and the Y-direction are both within $\Delta L$ (S29, S30). Then, it is further determined whether or not an amount of change in tool force from tool force $P_0$ to the current tool force P is within $\Delta P$ (S31). If the results of determinations in S30 and S31 are both YES, the sequence goes to S33.

In S33, the tool force $P_0$ and the coordinate $(X_0, Y_0)$ at a start of measuring an elapsed time are passed as factors to the cursor plotting process routine shown in FIG. 4, to execute the cursor plotting process.

In S34, the same factors as the above-mentioned factors are passed to the routine for executing the plotting/editing process. Here, in the plotting/editing process, it is assumed that the tool force is fixed at a predetermined value ($P_0$). Namely, as shown in FIG. 14(a), even if the tool force is slightly increased or decreased from $P_0$, it is ensured that the plotting/editing process are performed at the fixed tool force $P_0$. Thereafter, the sequence returns to the main routine.

As described, in S33 and S34, if an elapsed time after the timer is set ON is within $T_{max}$, and the conditions in S30 and S31 are satisfied, no change would be made in the cursor and the width of the plotting line. In this way, when the user performs a pen operation, whether or not respective changes in amount of coordinate and tool force are within predetermined ranges can be visually determined by the user.

If a result of determinations in S30 or S31 is NO, the timer is set OFF (S32), and the processes in S27 and S28 are executed, and the sequence returns to the main routine. In this state, as the timer is set OFF, wh en the routine is called next time, the processes in and after S21 are performed.

In S37, if the elapsed time t after the timer is set ON exceeds $T_{max}$, the fixed state flag is set ON (S38), and the tool force $P_0$ at a start of measuring an elapsed time is substituted for $P_{fix}$ (S39), and the timer is switched OFF (S40). By switching the fixed state flag to the ON position in S38, the fixed plotting/editing process in S6 is executed when the main routine in FIG. 3 is called next time, and the plotting or editing are executed according to the $P_{fix}$ irrespectively of the level of the tool force. Furthermore, in S41, the cursor plotting process shown in FIG. 4 is executed. In this state, as the fixed state flag is in the ON position, the design or icon are appended to the cursor as described earlier. The factor $P_{fix}$ is referred to in the next fixed plotting/editing process (S6) in the main routine, and the cursor plotting process and the plotting/editing process are performed based on the tool force $P_{fix}$.

Variable Plotting/Editing Process (2)

Figure 9:
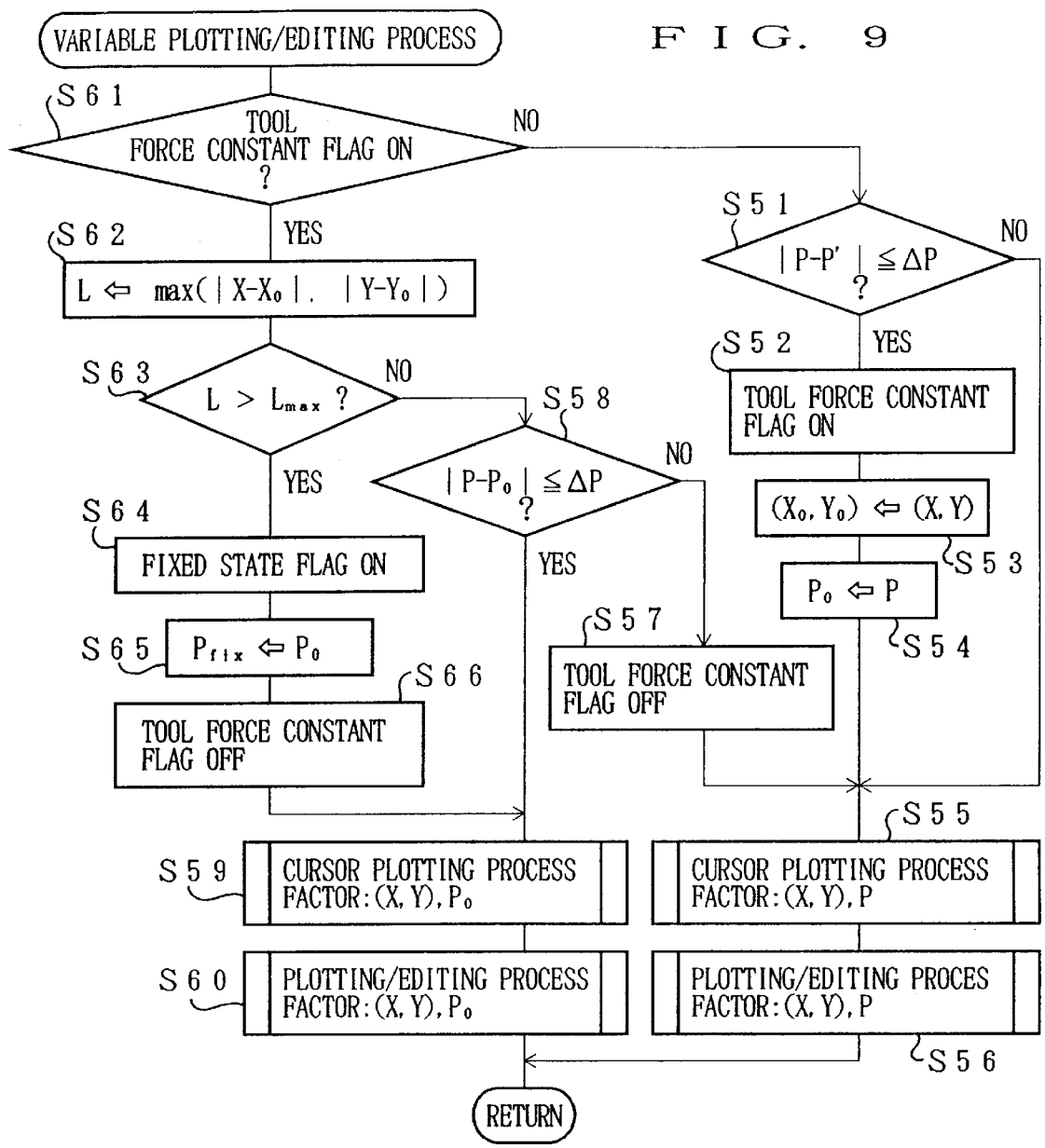
FIG. 9 is a flowchart showing another example of the variable plotting/editing process in the main routine shown in FIG. 3.
Figure 15:
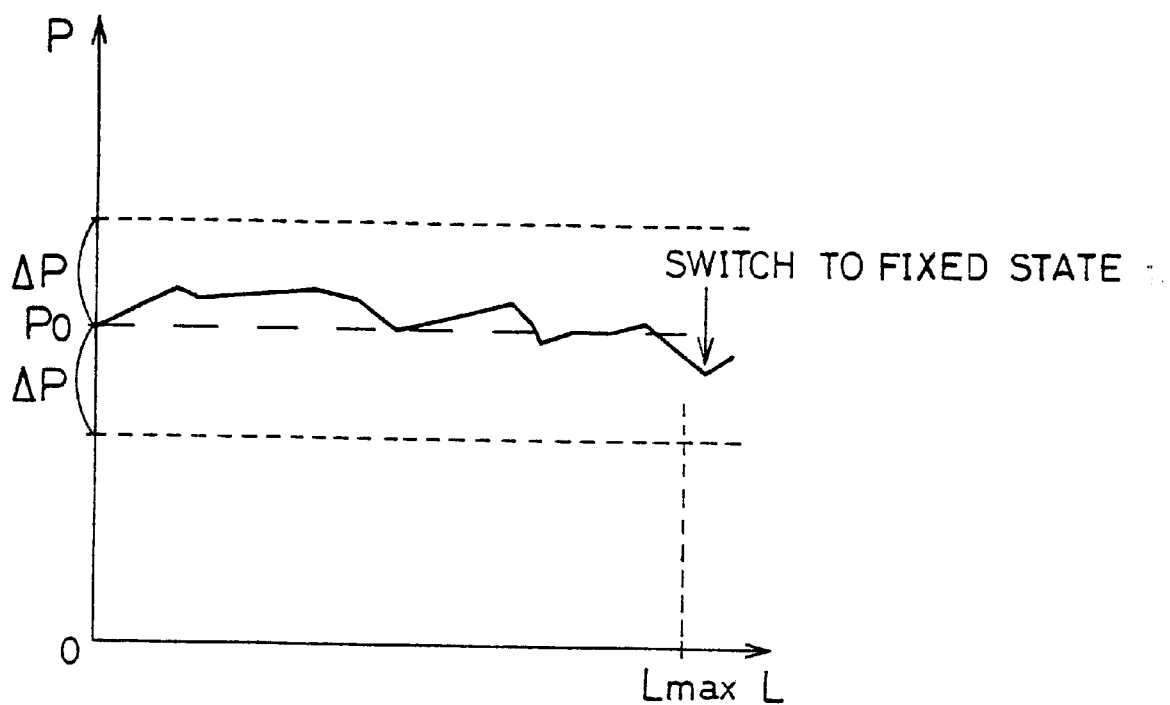
FIG. 15 is a graph showing one example of an amount of change in tool force with respect to an amount of change in coordinate when an operational mode is switched from a variable mode to a fixed mode.

Another example of the variable image plotting/editing process (S5) in the main routine of the document processing device in accordance with the present embodiment will be explained in reference to FIG. 9. This example has the following feature: As shown in FIG. 15, an amount of change in tool force P with respect to a change in coordinate L is detected. As a result of detection, if an amount of change in tool force while the coordinate position moves for a predetermined distance ($L_{max}$) is within a predetermined value ($\Delta P$), the fixed state flag is switched from the OFF position to the ON position.

Here, the required condition for initiating the measurement of an amount of change in tool force is that an amount of change in tool force from the tool force preserved in P' in S8 of the previous execution of the main routine to the current tool force P is within $\Delta P$ (S51). If the result of determination in S51 is NO, the sequence moves to S55 where the cursor plotting process is performed based on the current coordinate position (X, Y) and the tool force P as factors, and subsequently, the plotting/editing process are performed by sending the same factors to the main routine (S56).

On the other hand, if the result of determination in S51 is YES, the fixed tool force flag is switched to the ON position in S52. Furthermore, the current coordinate and the tool force are respectively substituted for ($X_0$, $Y_0$) and $P_0$ (S53 and S54). Further, the processes in S55 and S56 are performed, and the sequence goes back to the main routine. Namely, ($X_0$, $Y_0$) and $P_0$ are the coordinate and the tool force at a start of measuring an amount of change in tool force. Additionally, when the described routine is called next time, the process in and after S62 is performed in the following manner as the tool force flag is set to the ON position in S52.

In S62 and S63, it is determined whether or not a maximum changes in amount of coordinate from ($X_0$, $Y_0$) at a start of measurement of an amount of change in tool force to the current coordinate position (X, Y) respectively in the X direction and the Y direction exceeds the predetermined maximum value $L_{max}$ for the amount of change. If the result of determination in S63 is NO, it is determined in S58 whether or not an amount of change in tool force from $P_0$ to P is not more than $\Delta P$.

If the result of determination in S58 is YES, the processes in S559 and S560 are executed, and the sequence returns to the main routine. Here, in the cursor editing process in S59, as $P_0$ is passed as a factor of the tool force, while an amount of change in coordinate is within $L_{max}$ and an amount of change in tool force is within $\Delta P$, the user can visually recognize during a pen operation that an amount of change in tool force is within a predetermined amount according to the shape and/or size of the cursor displayed based on the predetermined tool force $P_0$.

On the other hand, if the result of determination in S58 is NO, as an amount of change in tool force exceeds a predetermined amount, the fixed tool force flag is switched to the OFF position (S57). Then, the processes in S55 and S56 are executed, and thereafter the sequence returns to the main routine.

If the result of determination in S63 is YES, the fixed state flag is switched to the ON position (S64), and the tool force $P_0$ at a start of measurement is substituted for $P_{fix}$. Thereafter, the fixed tool force flag is switched to the OFF position (S66), and the processes in S59 and S60 are executed. Then, the sequence goes back to the main routine. Here, the factors to be sent for the cursor plotting process in S59 and the plotting/editing process in S60 are the current coordinate (X, Y) and the tool force $P_0$ at a start of measurement.

Fixed Plotting/Editing Process (1)

Figure 10:
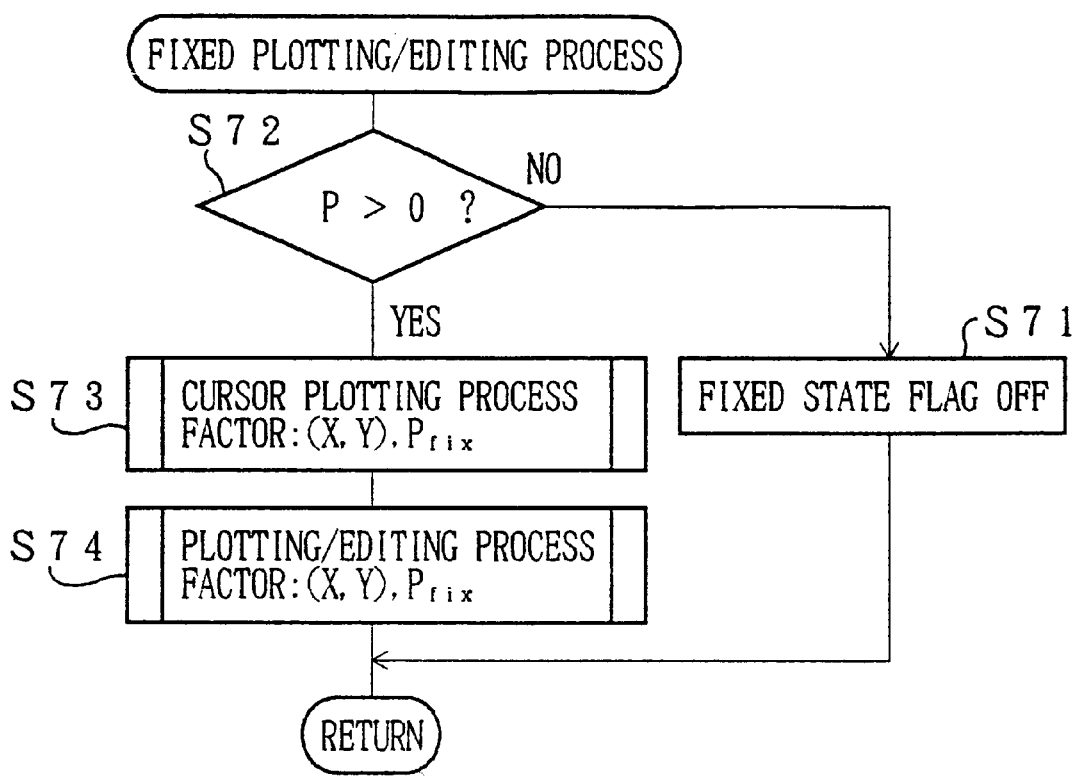
FIG. 10 is a flowchart showing an example of a fixed plotting/editing process in the main routine shown in FIG. 3.

An example of the fixed plotting/editing process (S6) of the main routine shown in FIG. 3 will be explained in reference to FIG. 10. The routine shown in FIG. 10 is arranged such that the coordinate (X, Y) and the fixed tool force $P_{fix}$ are sent as factors from the main routine, and the plotting/editing process are performed based on the fixed tool force $P_{fix}$. Here, if the tool force added by the user becomes 0, the fixed state flag is switched from the ON position to the OFF position, and the fixed state is cancelled.

Figure 16:
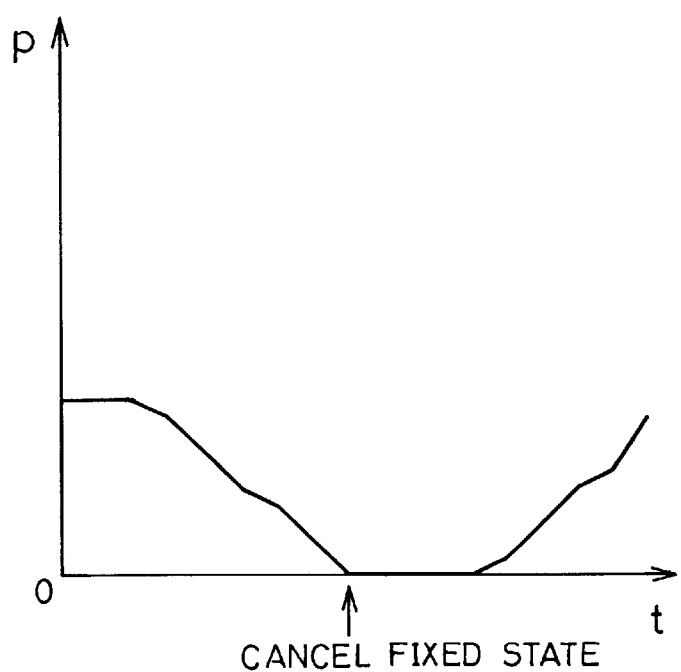
FIG. 16 and FIG. 17 are graphs respectively showing examples of changes in tool force when an operational mode is switched from a fixed mode to a variable mode.

For example, as shown in FIG. 16, when the tool force is not more than 0, i.e., the pen 21c is not in contact with the tablet 21d, the fixed state flag is switched to the OFF position in S71, and the sequence returns to the main routine. As the fixed state flag is set to the OFF position in the described manner, when the next pen event occurs and the main routine in FIG. 3 is executed, a variable plotting/editing process (S5) is executed, and the type of the plotting/editing mode are varied according to the tool force. Similarly, by switching the fixed state flag to the OFF position, S14 in the flowchart shown in FIG. 4 is avoided when executing the routine of the cursor plotting process called from the variable plotting/editing process, and the design and the icon appended at the locked state of the cursor are deleted.

On the other hand, if the tool force is greater than 0 in S72, the tool force $P_{fix}$ is sent as a factor, and the cursor plotting process (S73) and the plotting/editing process (S74) are executed. Thereafter, the sequence returns to the main routine. The cursor plotting process and the plotting/editing process for lines, graphics, etc., are executed not based on the tool force currently applied by the user but based on the tool force $P_{fix}$ predetermined in the routine of FIG. 8 or FIG. 9.

Fixed Plotting/Editing Process (2)

Figure 11:
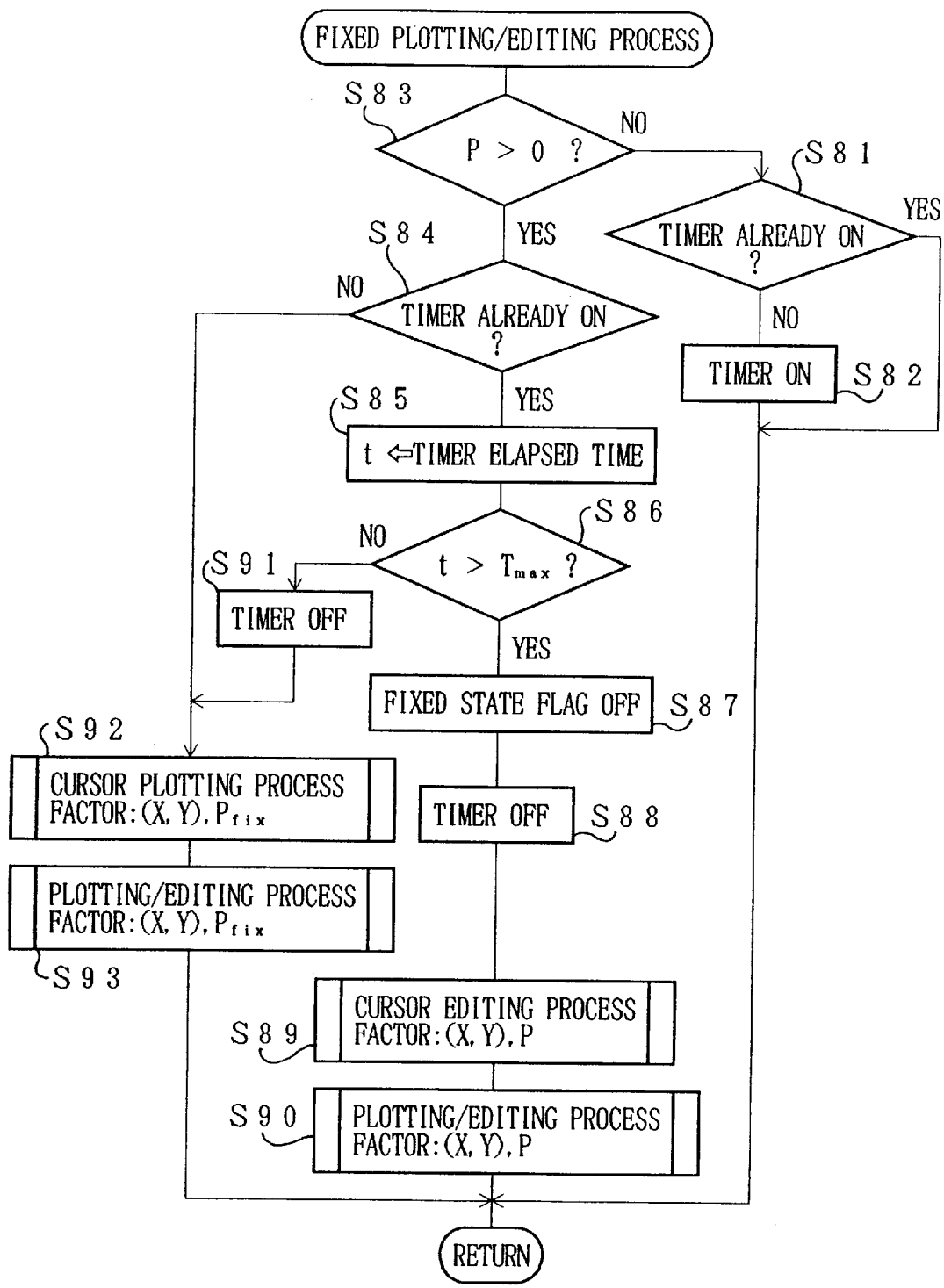
FIG. 11 is a flowchart showing another example of the fixed plotting/editing process in the main routine shown in FIG. 3.
Figure 17:
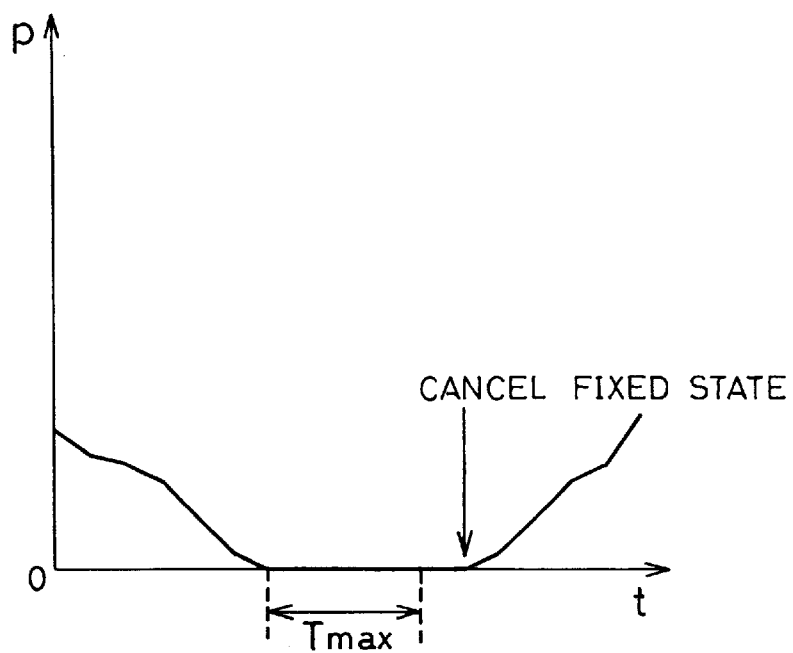
Figure 18:
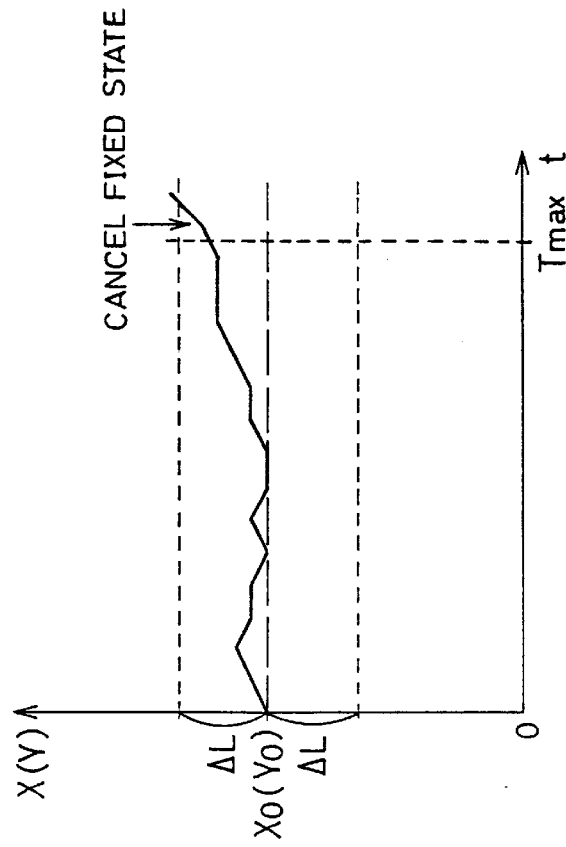
FIG. 18(a) and FIG. 18(b) are graphs respectively showing examples of changes in tool force and coordinate when an operational mode is switched from a fixed mode to a variable mode.
Figure 18:
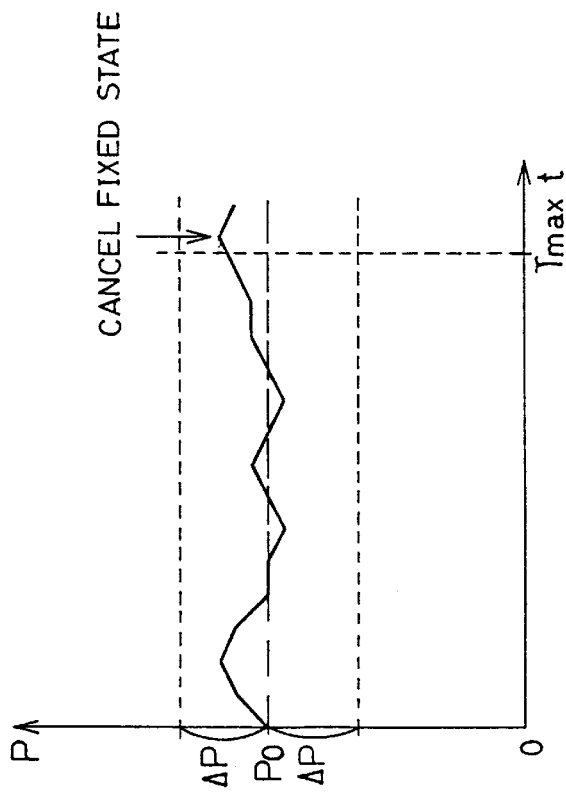
Figure 19:
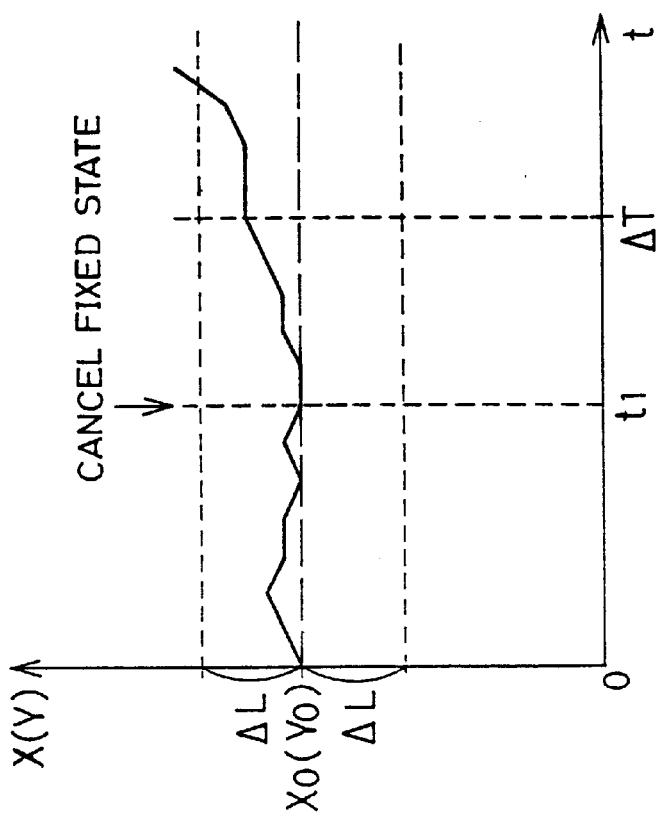
FIG. 19(a) and FIG. 19(b) are graphs respectively showing examples of changes in tool force and coordinate when an operational mode is switched from a fixed mode to a variable mode.
Figure 19B:
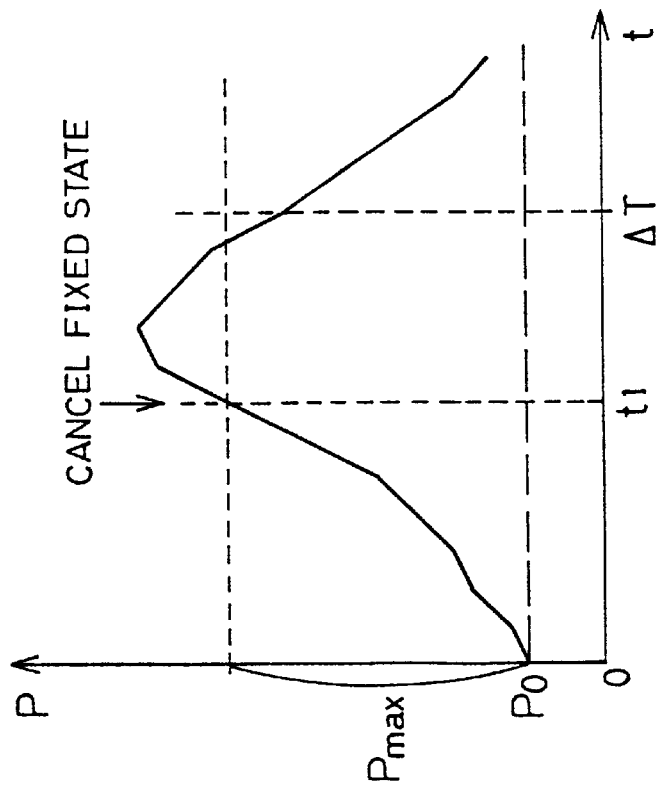

Another example of the fixed plotting/editing process in S6 of the main routine will be explained in reference to FIG. 11. This example features in that as shown in FIG. 17, when a predetermined time ($T_{max}$) has elapsed after the tool force becomes 0, the fixed state is cancelled.

First, when the current tool force is not more than 0 (if NO in S83), the timer is set ON and the measuring of an elapsed time is started (S81 and S82). Here, in S81, it is determined whether or not the timer is already set ON. If the result of determination in S81 is YES, the process in S82 is skipped to solve such problem that a pen event occurs while the pen 21c loses contact with the tablet 21d.

On the other hand, if the tool force is greater than 0, i.e., (If YES in S83), it is determined whether or not the timer is already set ON (S84). If the result of determination in S84 is NO, a fixed tool force $P_{fix}$ is sent as a factor, and the cursor plotting process (S92) and the plotting/editing process (S93) are executed. Thereafter, the sequence goes back to the main routine.

If it is determined in S84 that the timer is already set ON, an elapsed time t from a start of measuring of an elapsed time is compared with $T_{MAX}$ (S86). If the elapsed time t is not more than $T_{MAX}$ (If NO in S86), i.e., the time required for the pen 21c which once loses contact with the tablet 21d to come in contact again with the tablet 21d is not more than the predetermined time $T_{MAX}$, the timer is set OFF (S91), and the processes in S92 and S93 are executed. Thereafter, the sequence goes back to the main routine.

On the other hand, if the elapsed time t exceeds $T_{MAX}$, i.e., the time required for the pen 21c which once loses contact with the tablet 21d to come in contact again with the tablet 21d is more than the predetermined elapsed time $T_{MAX}$, the fixed state flag is switched to the OFF position (S87), and the timer is set OFF (S88). Then, the current coordinate (X, Y) and the CURRENT tool force P are passed as factors, and the cursor plotting process (S89) and the plotting/editing process (S90) are executed. Thereafter, the sequence goes back to the main routine.

Fixed Plotting/Editing Process (3)

Figure 12:
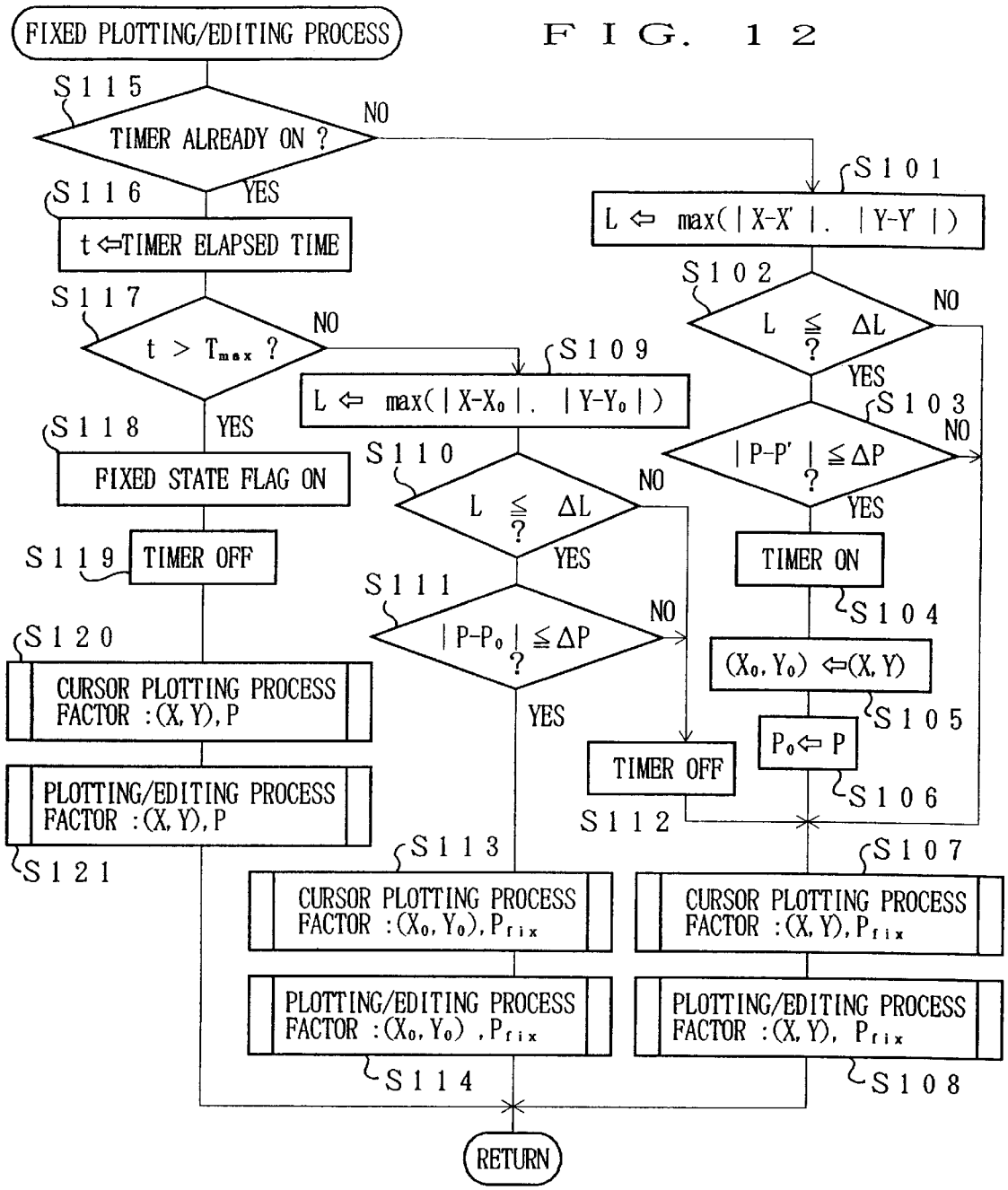
FIG. 12 is a flowchart showing still another example of the fixed plotting/editing process in the main routine shown in FIG. 3.

A still another example of the fixed plotting/editing process of S6 of the main routine will be explained in reference to FIG. 12. This example features in that the fixed state is cancelled when the following conditions are satisfied: An amount of change in tool force from $P_0$ is within $\Delta P$ for $T_{max}$ from a start of measuring an elapsed time as shown in FIG. 18(a); and an amount of change in coordinate from $(X_0, Y_0)$ respectively in the X-direction and the Y-direction is not more than $\Delta L$ for $T_{max}$ from a start of measuring time as shown in FIG. 18(b).

The conditions required for switching the fixed state flag to the OFF position are the same as those required for switching the fixed state flag to the ON position in the variable plotting/editing process shown in FIG. 8. Here, only the process which greatly differs from the process shown in FIG. 8 will be explained. In the fixed plotting/editing process, as the process such as a cursor plotting, etc., is performed irrespectively of the current tool force, $P_{fix}$ is sent to the subroutine as a factor in S107, S108, S113 and S114.

In S118, the fixed state flag is switched to the OFF position when the following conditions are satisfied: An amount of change in tool force from $P_0$ is not more than $\Delta P$ for $T_{max}$ from a start of measuring of an elapsed time as shown in FIG. 18(a); and amounts of change in coordinate from $(X_0, Y_0)$ respectively in the X-direction and the Y-direction are both not more than $\Delta L$ for $T_{max}$ from a start of measuring of an elapsed time as shown in FIG. 18(b).

Fixed Plotting/Editing Process (4)

Figure 13:
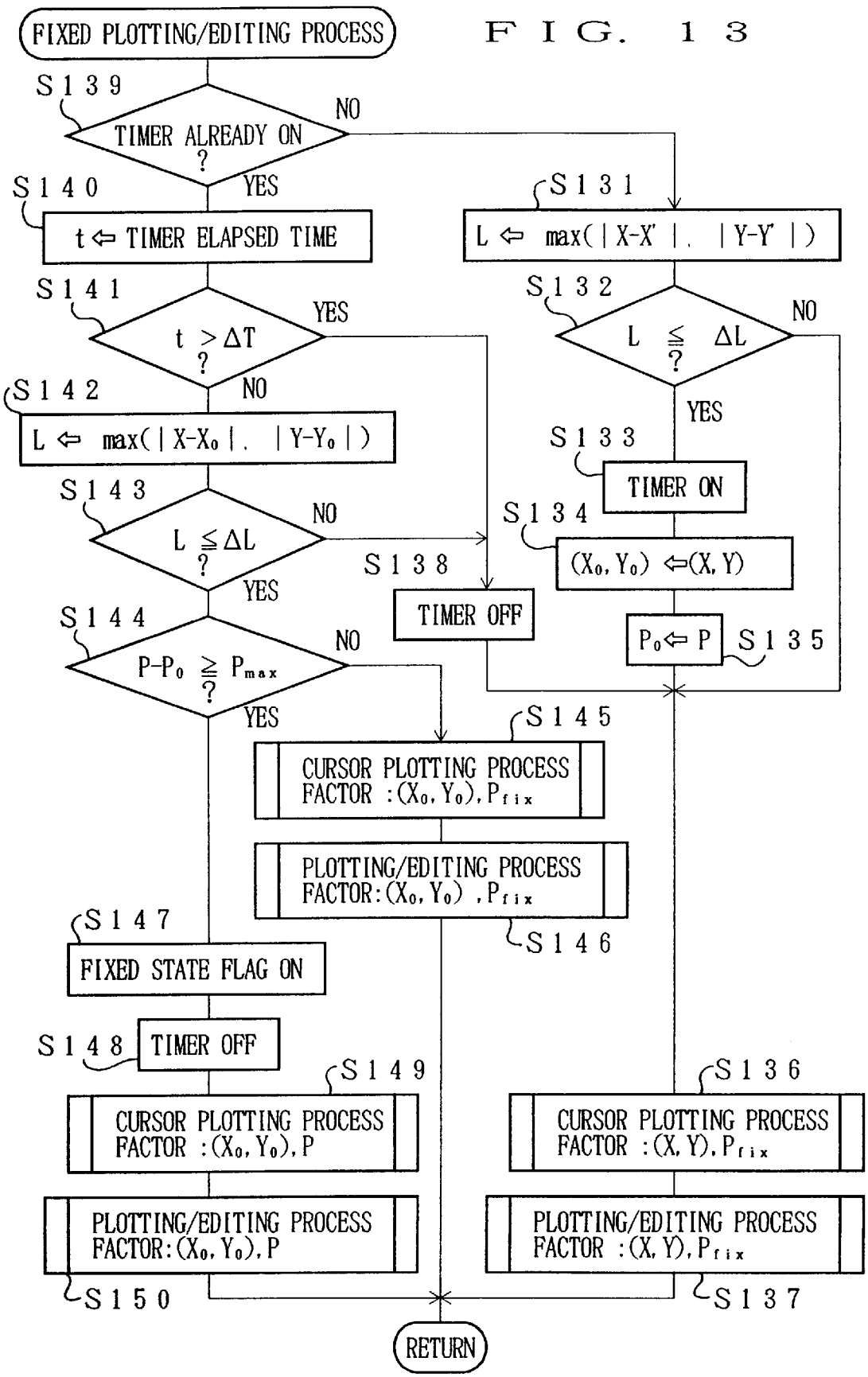
FIG. 13 is a flowchart showing still another example of the fixed plotting/editing process in the main routine shown in FIG. 3.

A still another example of the fixed plotting/editing process in S6 of the main routine will be explained in reference to FIG. 13. As shown in FIG. 19(a), this example features in that the fixed state is cancelled when the following conditions are satisfied: An amount of change in tool force is not less than $P_{MAX}$ within $\Delta T$ after the measuring of an elapsed time is started, and amounts of change in coordinate respectively in the X-direction and the Y-direction are both not more that $\Delta L$ from a start of measuring an elapsed time till ($t_1$) at which an amount of change in tool force P becomes not less than $P_{MAX}$.

The condition for initiating a measurement of an elapsed time is that amounts of change in coordinate from the coordinate (X', Y') preserved upon executing the previous main routine to the current coordinate (X, Y) are both not more than $\Delta L$ (S131, S132) in X direction and Y direction. If a result of determination in S132 is YES, the timer is set ON (S133), and the process in and after S134 are performed. Thereafter, the sequence returns to the main routine. On the other hand, if the result of determination in S132 is NO, the process in and after S136 are performed, thereby terminating the process. In this example, in S136 and S137, a constant tool force $P_{fix}$ which has no correlation with the tool force currently applied to the pen 21c by the user is sent as a factor.

When the routine is called, if the timer is set ON (if YES in S139), i.e., if a measurement of an elapsed time has started, first, it is determined whether or not an elapsed time t is longer than $\Delta T$ (S141). Here, AT is set beforehand. If the result of determination in S141 is YES, the sequence goes back to S138, and the timer is set OFF. Thereafter, the processes in S136 and S137 are performed, and the sequence goes back to the main routine. As in the described case, in S136 and S137, the fixed tool force $P_{fix}$ which has no correlation with the tool force currently applied to the pen 21c by the user is sent as a factor.

On the other hand, if the result of determination in S141 is NO, it is determined whether or not an amount of change in coordinate from a start of measuring an elapsed of time till now is not more than $\Delta L$ (S142, S143). Then, it is further determined whether or not an amount of change in tool force from the tool force $P_0$ at a start of measuring an elapsed time to the current tool force P is not less than $P_{MAX}$ (S144). If the results of determinations in S143 and S144 are both YES, the fixed state flag is set to the OFF position (S147), and the timer is set OFF (S148). Thereafter, the processes in S149 and S150 are executed, and the sequence returns to the main routine. In S149 and S150, since the fixed mode has been cancelled, not $P_{fix}$ but P is sent as a factor.

Here, by applying a largest possible tool force to $P_{MAX}$ previously, it is permitted to narrow down the pen operation for cancelling the fixed state to some extent. For example, when the largest possible tool force is $P_{MAX}$, in order to obtain the result of determination in S144 to be YES, $P_{MAX} - P_0 \geq P_{max}$ which can be rewritten as $P_0 \leq P_{MAX} - P_{max}$ should be satisfied. Therefore, $P_0$ is required to be approximated to 0. Therefore, the user is required to intentionally perform the following process: That is, once a tool force is reduced to a vicinity of 0, and thereafter, within a predetermined elapsed time, the tool force is raised to the largest possible value while maintaining an amount of change in coordinate to fall within a predetermined range. As a result, an occurrence of such problem that the fixed state is cancelled against the user's will during the plotting/editing process in the fixed mode can be suppressed, thereby obtaining an improved operability.

On the other hand, if the result of determination in S144 is NO, as whether or not the conditions for cancelling the fixed mode are satisfied is being detected, the coordinate during the detection is fixed to the coordinate $(X_0, Y_0)$ at a start of measuring an elapsed time (S145, S146), and the plotting/editing process is prevented from being triggered in response to change in coordinate.

In the described S38 and S64, by beeping from the speaker 32 under a control of the sound output device 31, the user is informed of a change in operational mode to the fixed mode. Similarly, in S71, S87, S118 or S147, by beeping, the user is informed of that the fixed mode has been cancelled.

Furthermore, it may be arranged such that $\Delta L$, $\Delta P$ and $T_{max}$ used in the plotting/editing process (1) are preserved in the RAM 28 as variables, and the numeral values inputted by the user by means of the pen input device 21 or the keyboard 27 are substituted therefor. As a result, the user can set required conditions for switching the fixed state flag to the fixed state as desired. Similarly, as to $\Delta P$ and $L_{max}$ used in the variable plotting/editing process (2), as well as $\Delta L$, $\Delta P$, and $T_{max}$ used in the fixed plotting/editing process (3) and the $\Delta L$, $\Delta T$ and $P_{max}$ used in fixed plotting/editing process (4), the required conditions for cancelling the fixed state can be set as desired by the user.

Second Embodiment

The following descriptions will discuss still another embodiment of the present invention in reference to FIG. 20 through FIG. 47.

Figure 20:
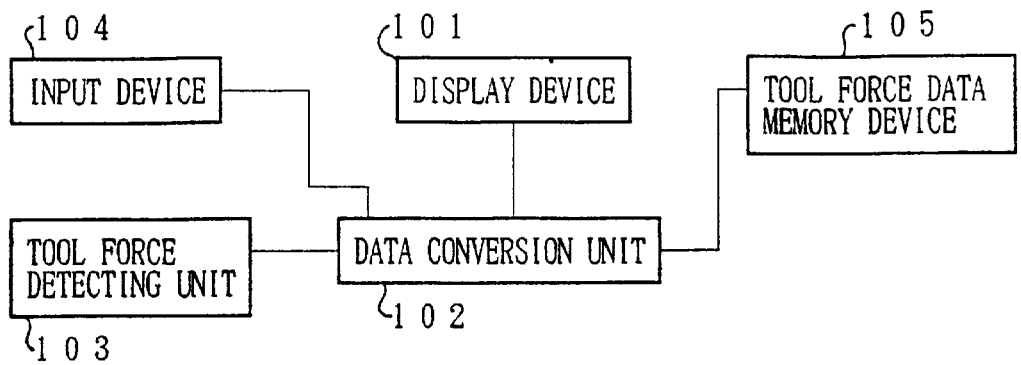

FIG. 20 is a block diagram showing a structure of the document processing device in accordance with the present embodiment. The document processing device shown in FIG. 20 is characterized by including a tool force detecting unit 103 such as a tablet, etc., for detecting a tool force, an input device 104 such as a pen, etc., a tool force data memory device 105, a data conversion unit 102, and a display device 101.

The tool force data memory device 105 stores therein information indicative of tool force obtained from the tool force detecting unit 103 and the input device 104. The data conversion unit 102 converts data indicative of tool force obtained from the tool force detecting unit 103 into data for use in internal processing.

The tool force detecting unit 103 may be structured such that piezoelectric elements are provided under the tablet as disclosed in Japanese Laid-Open Patent Publication No. 282094/1993 (Tokukaihei 5-282094). The tool force detecting unit 103 may be structured such that piezoelectric elements that can be bent by applying thereto a pressure are provided within an input pen.

Figure 21:
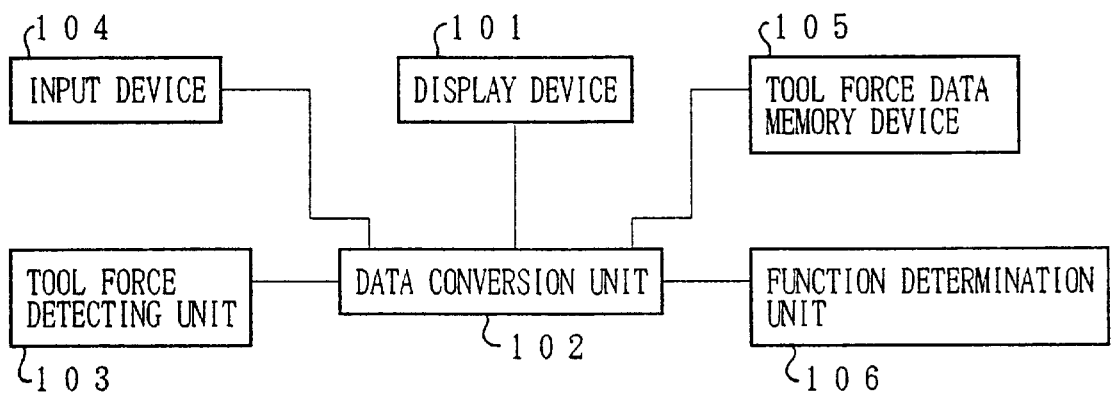

FIG. 21 is block diagram showing one modification of the document processing device shown in FIG. 20.

The document processing device shown in FIG. 21 is characterized by including a function determination unit 106 for determining a function selected by the user in addition to the tool force detecting unit 103, the input device 104, tool force data memory device 105, the data conversion unit 102 and the display device 101. The display device 101 has a function for displaying an indicator indicative of an amount of tool force (level of the tool force) being applied by the user. The display device 101 adds a display scale to the indicator in accordance with the function determined by the function determination unit 106.

Figure 22:
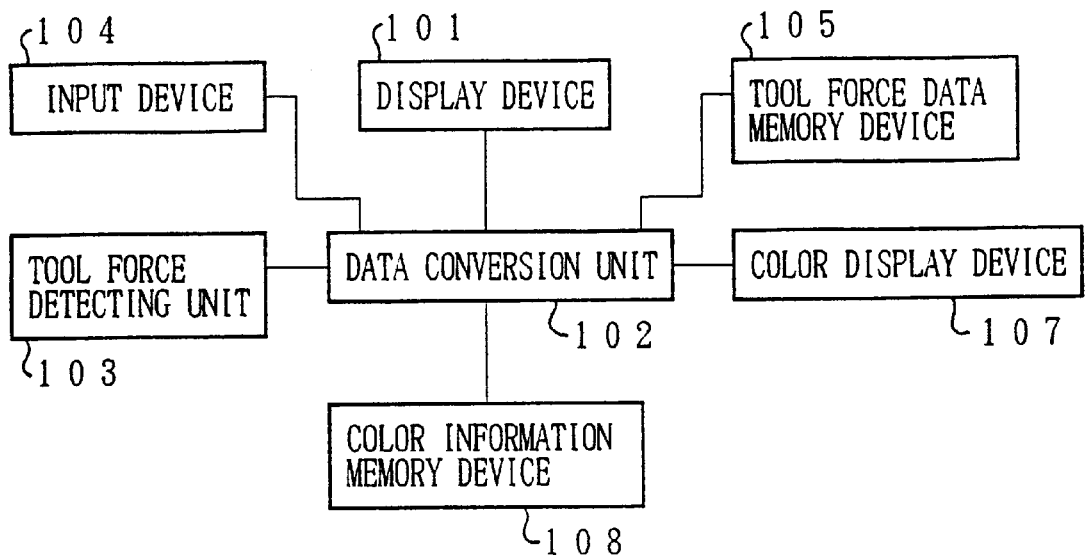

FIG. 22 is a block diagram showing another modification of the document processing device of FIG. 20. The document processing device of FIG. 22 is characterized by including a color display device for varying a color of the indicator to be displayed in the display device 101 according to the level of the tool force and a color information memory device 108 for storing a color corresponding to each level of the tool force in addition to the tool force detecting unit 103, the input device 104, the tool force data memory device 105, the data conversion unit 102 and the display device 101.

Figure 23:
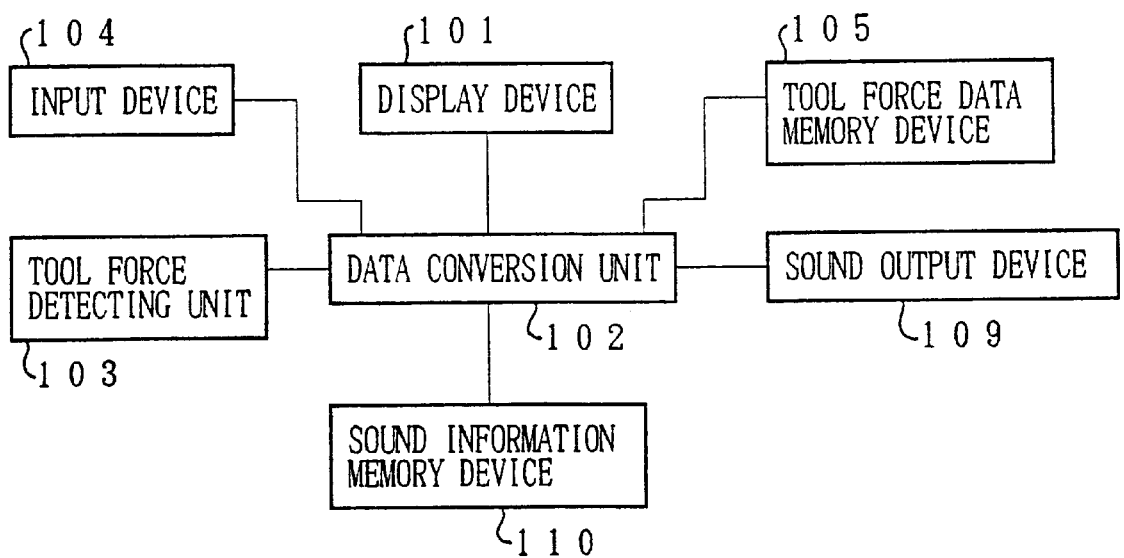

FIG. 23 is a block diagram showing still another modification of the document processing device of FIG. 20. The document processing device of FIG. 23 is characterized by including a sound information memory device 110 for storing sound corresponding to each level of the tool force and a sound output device 109 for outputting a sound corresponding to each level of tool force in addition to the tool force detecting unit 103, the input device 104, the tool force data memory device 105, the data conversion unit 102 and the display device 101.

Figure 24:
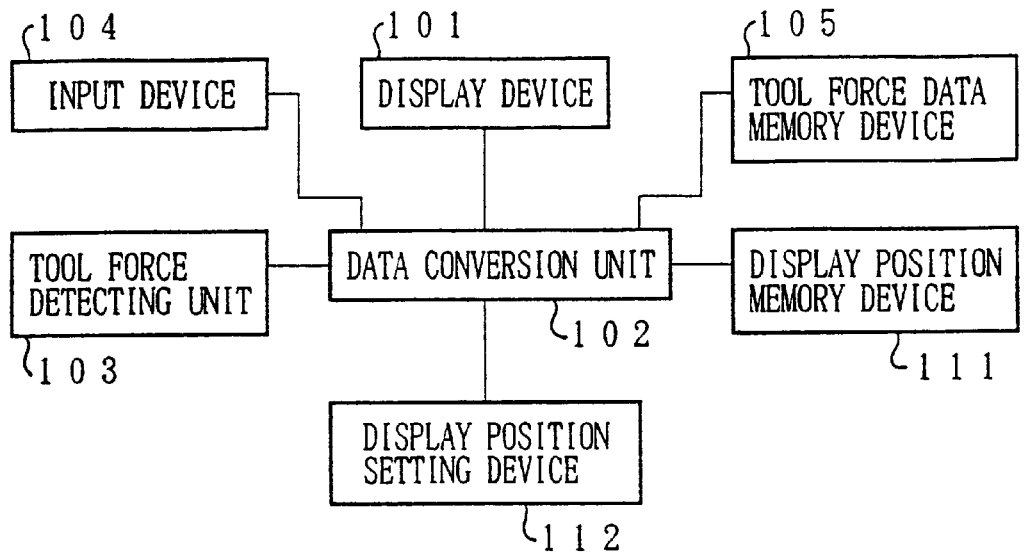

FIG. 24 is a block diagram showing still another modification of the document processing device of FIG. 20. The document processing device of FIG. 24 is characterized by including a display location setting device 112 which allows the user to set a display location of the indicator indicative of the level of the tool force as desired and a display location memory device 111 for storing a display location of the indicator that is set by the user, in addition to the tool force detecting unit 103, the input device 104, the tool force data memory device 105, the data conversion unit 102 and the display device 101.

Figure 25:
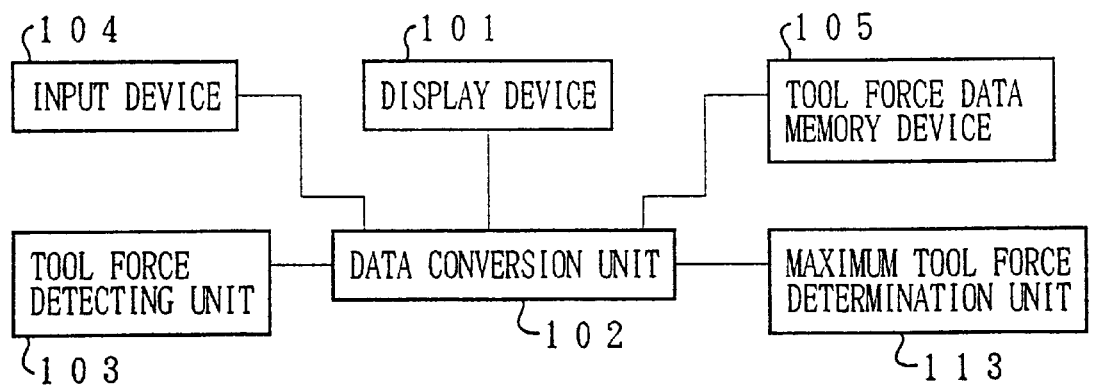

FIG. 25 is a block diagram showing still another modification of the document processing device of FIG. 20. The document processing device of FIG. 25 is characterized by including a maximum tool force determination unit 113 for determining whether or not a tool force applied by the user exceeds a permissible level in the hardware including the input device 104 and the tool force detecting unit 103, in addition to the tool force detecting unit 103, the input device 104, the tool force data memory device 105, the data conversion unit 102 and the display device 101. In this arrangement, if the maximum tool force determination unit 113 determines that the tool force applied by the user exceeds the permissible level, the maximum tool force determination unit 113 displays a warning message in the display device 101.

Figure 26:
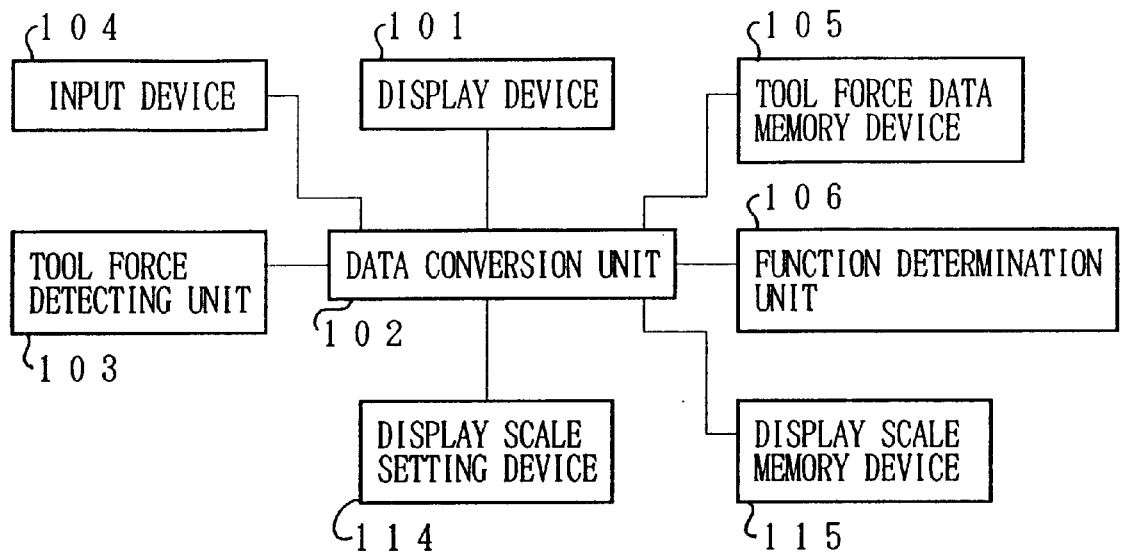

FIG. 26 is a block diagram showing still another modification of the document processing device of FIG. 20. The document processing device of FIG. 26 is characterized by including a display scale setting unit 114 which allows the user to set a display scale to be added to the indicator as desired, the indicator being displayed in the display device 101 so as to indicate the tool force and a display scale memory device 115 for storing therein the display scale set by the user, in addition to the tool force detecting unit 103, the input device 104, the tool force data memory device 105, the data conversion unit 102, the display device 101 and the function determination unit 106.

Figure 27:
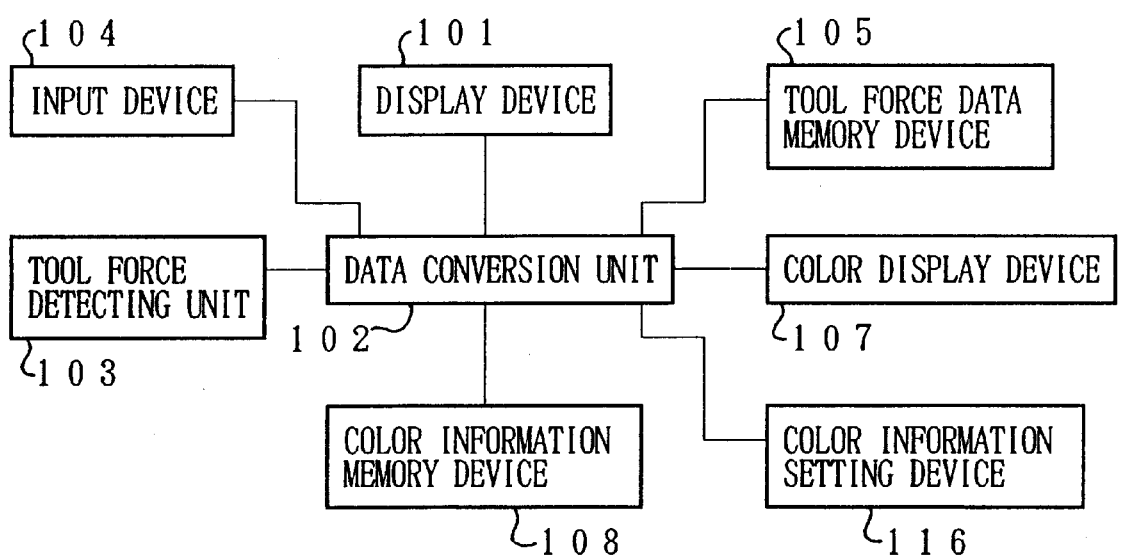

FIG. 27 is a block diagram showing still another modification of the document processing device of FIG. 20. The document processing device of FIG. 27 is characterized by including a color information setting unit 116 which allows the user to set color according to a level of the tool force as desired, in addition to the tool force detecting unit 103, the input device 104, the tool force data memory device 105, the data conversion unit 102, the display device 101, the color display device 107 and the color information memory device 108. In this arrangement, the color set by the user in accordance with each level of the tool force by means of the color information setting unit 116 is stored in the color information memory device 108.

FIG. 28 is a block diagram showing still another modification of the document processing device of FIG. 20. The document processing device of FIG. 28 is characterized by including a sound information setting device 117 which allows the user to set sound in accordance with each level of the tool force as desired in addition to the tool force detecting unit 103, the input device 104, the tool force data memory device 105, the data conversion unit 102, the display device 101, the sound output device 109 and the sound information memory device 110. In the described arrangement, a sound set by the user in accordance with each level of the tool force by means of the sound information setting device 117 is stored in the sound information memory device 110.

FIG. 29 is a block diagram showing still another modification of the document processing device of FIG. 20. The document processing device of FIG. 29 is characterized by including a fixed tool force mode setting device 118 for switching an operational mode to a fixed tool force mode in which a plotting is performed at a fixed tool force and a fixed tool force mode cancelling unit 119, in addition to the tool force detecting unit 103, the input device 104, the tool force data memory device 105, the data conversion unit 102 and the display device 101. Namely, in the described arrangement, by switching an operational mode by the user to the fixed tool force mode by means of the fixed tool force mode setting device 118, a plotting process is performed at a predetermined constant tool force irrespectively of tool force actually applied by the user. Here, the predetermined tool force may be altered as desired by the user by means of the fixed tool force mode setting device 118. When the operational mode is set to the fixed tool force mode, the user is permitted to cancel the fixed tool force mode by means of the fixed tool force mode cancelling unit 119 so that the operational mode is switched to a variable mode in which a plotting process is performed with a line of a variable width by adjusting the tool force applied by the user.

Figure 30:
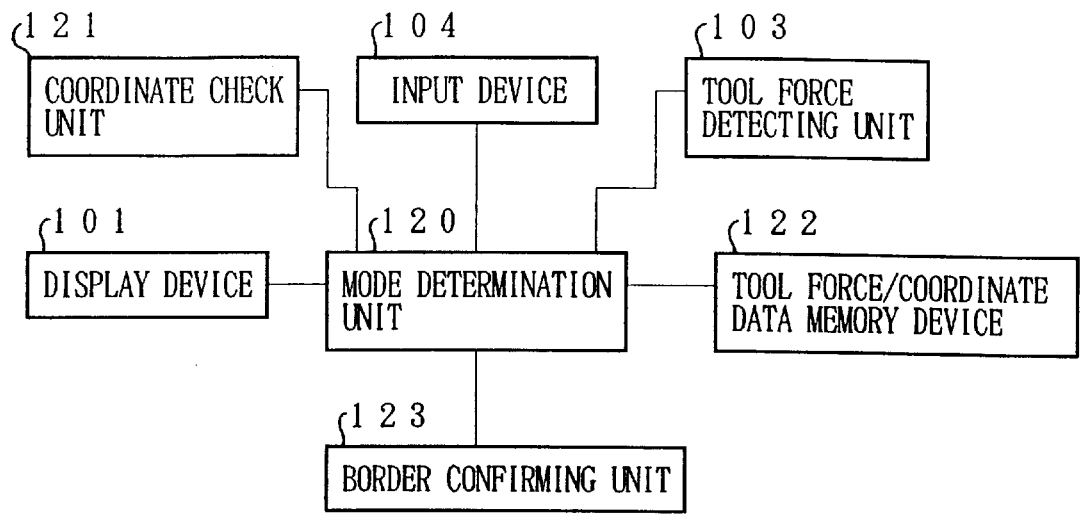

FIG. 30 is a block diagram showing still another modification of the document processing device of FIG. 20. The document processing device of FIG. 30 is characterized by including a mode determination unit 120, a coordinate check unit 121, a tool force/coordinate data memory device 122, and a border confirming unit 123, in addition to the tool force detecting unit 103, the input device 104 and the display device 101. The tool force/coordinate data memory device 122 stores a coordinate specified by the user by means of the input device 104, and the tool force on this occasion. The coordinate check unit 121 determines whether or not a graphic border, etc., is specified based on the coordinate specified by the user by means of the input device 104. The mode determination unit 120 determines whether or not a scaling of the border is specified based on the tool force applied by the user. The border confirming unit 123 confirms the size of the border according to the tool force applied by the user by means of the input device 104 when scaling the border.

The border specifies an object subject to editing as desired, and includes graphics, a character and an image.

Figure 31:
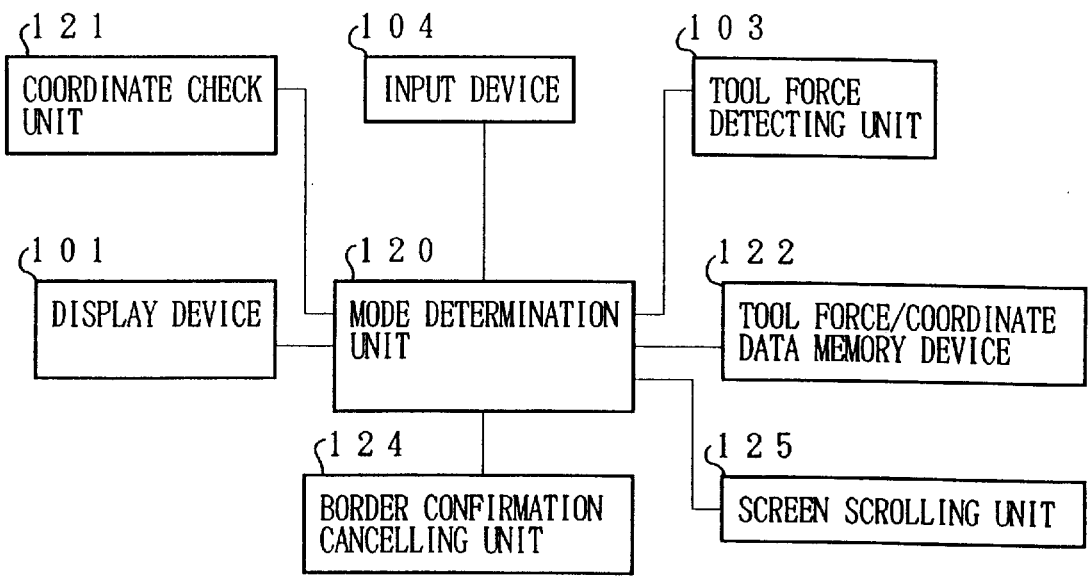

FIG. 31 is a block diagram showing still another modification of the document processing device of FIG. 20. The document processing device of FIG. 31 is characterized by including a border confirmation cancelling unit 124 and a screen scrolling unit 125, in addition to the display device 101, the tool force detecting unit 103, the input device 104, the mode determination unit 120, the coordinate check unit 121, and the tool force/coordinate data memory device 122. In the described arrangement, the display device 101 displays an observation window for simultaneously displaying therein an enlarged view of an entire and a part of the document being edited, for allowing the user to edit the document within the observation window. The mode determination unit 120 determines based on the tool force whether a fixed screen mode in which only the specified border is moved or a scroll mode in which the screen is scrolled within the observation window is specified. The border confirmation cancelling unit 124 cancels the determination of the border in the scroll mode. The screen scrolling unit 125 scrolls the screen displayed in the observation window of the display device 101 in the scroll mode.

The following will explain a concrete example of the present embodiment. However, it should be noted there that the present invention is not limited to such preferred example.

Figure 32:
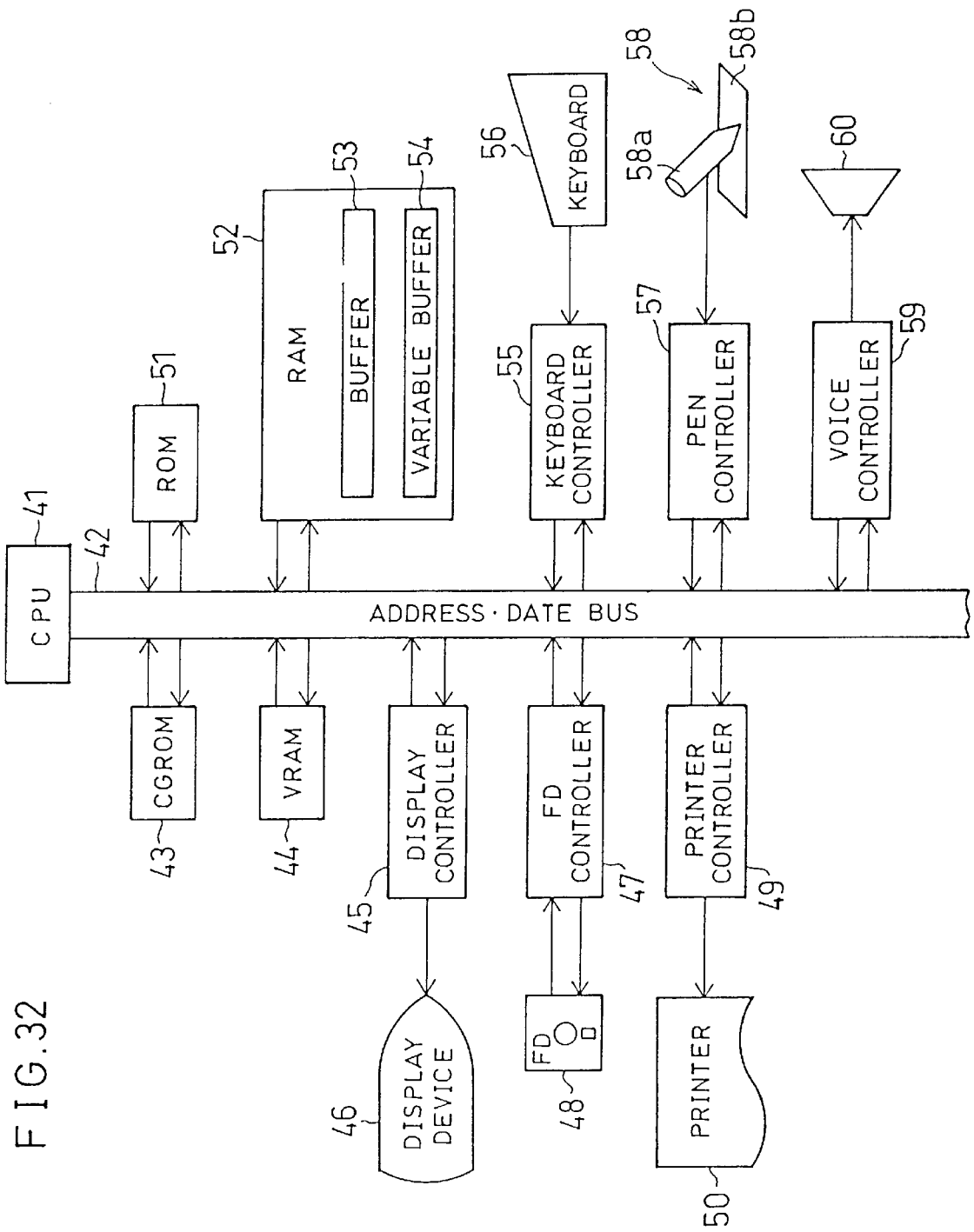
FIG. 32 is a block diagram showing a more detailed structure as an example of the document processing device of FIG. 20.

FIG. 32 is a block diagram showing a structure of the document processing device in accordance with the present embodiment. As shown in FIG. 32, the document processing device includes a central processing unit (CPU) 41, an address data bus 42, and a CGROM (Character Generator Read Only Memory) 43. The CPU 41 controls the apparatus as a whole and performs a communication of the data by executing the program store in a ROM 51. The address data bus 42 is used for allowing each member of the apparatus to perform a communication of data. The CGROM 43 stores a bit map and outline font data for characters, symbols, etc., which can be displayed and printed in the document processing device of the present embodiment.

The document processing device includes a VRAM 44, a display controller 45, a display device 46 such as a liquid crystal panel, a CRT, etc., a FD (Floppy Disk) controller 47, and a FD drive 48. The VRAM 44 has an address structure that has one to one correspondence to coordinates on the screen of the display device 46 and holds the image on the screen to be displayed by the bit map. The display controller 45 controls such that the display data for one screen stored in the VRAM 44 is displayed on the display device 46 at a real time. The FD controller 47 controls the FD drive 48 to store the data, etc., and read out the stored data.

The document processing device further includes a printer controller 49, a printer 50, a ROM 51, a RAM 52, a keyboard controller 55, a keyboard 56, a pen controller 57, a pen input device 58, a voice controller 59 and a speaker 60.

The pen input unit 58 includes a pen 58a and a tablet 58b, and is arranged such that when the user touches the tablet 58b with the pen 58a, information indicative of its coordinate, tool force, etc., is sent to the pen controller 57. The pen controller 57 sends these information to the CPU 41. The tablet 58b is transparent, and is laminated on the surfaces of the display device 46.

The printer controller 49 is provided for printing image data stored in the RAM 52 by controlling a printer 50. The ROM 51 stores therein a control program which the CPU 41 refers to in controlling the device. The RAM 52 includes a coordinate buffer 53 and a variable buffer 54. The coordinate buffer 53 stores therein data including coordinate data, etc. The variable buffer 54 stores therein data for use in controlling the device by the CPU 41 or performing an editing process by the CPU 41.

The keyboard controller 55 sends a key code inputted by the keyboard 56 to the CPU 41. The voice controller 59 controls the speaker 60 to beep.

Figure 33:
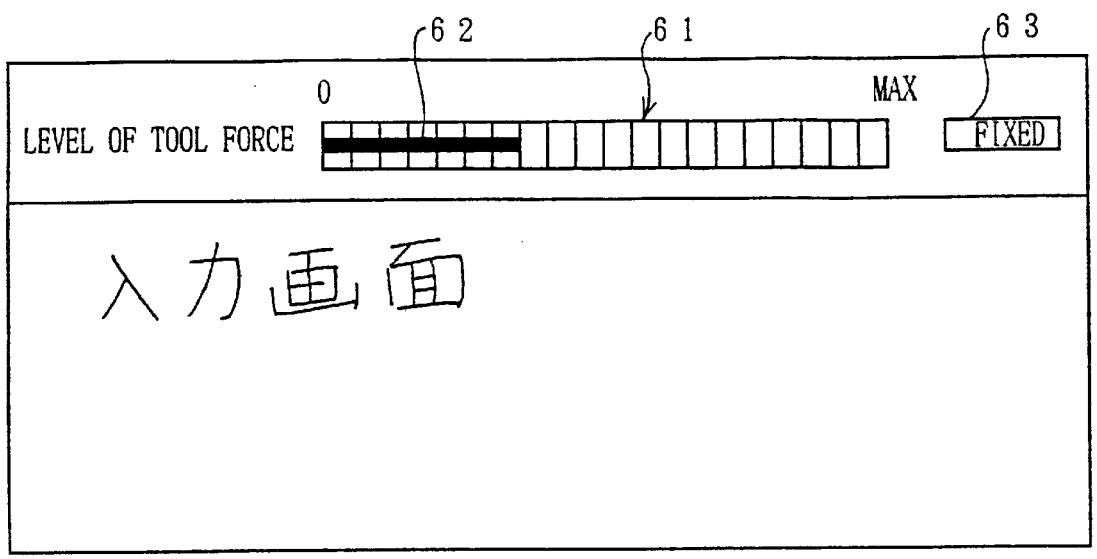
FIG. 33 is an explanatory view showing one example where an indicator is displayed on a display screen of the document processing device.

The described document processing device features in that the indicator which permits the tool force applied by the user with the pen 58a to be recognized at a glance is displayed on a screen of the display device 46. FIG. 33 is an explanatory view showing one example where an indicator 61 is displayed on the upper portion of the screen of the display device 46. In this example, it is arranged such that the tool force is switched into plural levels from no tool force (0) to maximum tool force (MAX), and is indicated by a pointer 62 of the indicator 61. As described, by displaying the indicator 61 on the screen for performing an input operation by the user, the user can recognize how strong is the tool force being applied at a glance while performing a pen operation.

In the document processing device, generally, a plotting process is performed according to the tool force applied by the user with the pen 58a, for example, in such a manner that when the tool force is large, a thick line is plotted, while when the tool force is small, a thin line is plotted. However, to permit the user also to plot with a predetermined line width, a button 63 is provided besides the indicator 61 for fixing the tool force. When the user depresses this button 63 with the pen 58a, the operational mode is switched to the fixed tool force mode in which a plotting process, etc., is performed at a fixed tool force irrespectively of the tool force actually applied by the user. In the described fixed tool force mode, the tool force may be fixed at any tool force as desired by the user as will be described in detail later.

In the document processing device, the tool force is divided into plural levels, and a color of the pointer 62 displayed on the indicator 61 varies according to the level of the tool force. When the level of the tool force varies according to the pen operation by the user, a beeping sound corresponding to each tool force level is outputted. What color and sound are to be assigned for each tool force level may be set beforehand or set as desired by the user. The color and sound corresponding to each tool force level is stored in the tool force information table provided in the RAM 52.

Figure 34:
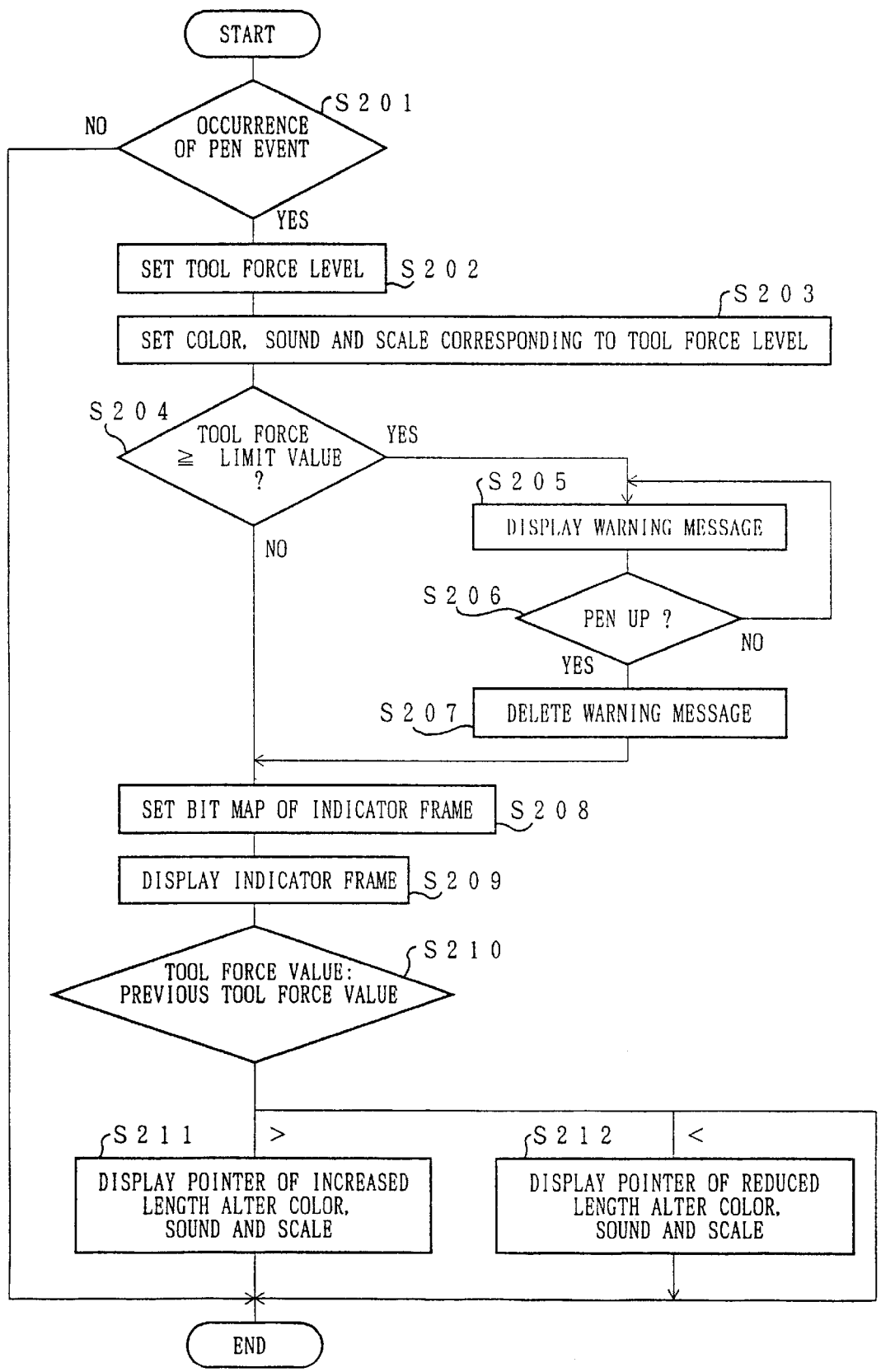
FIG. 34 is a flowchart showing a process of displaying an indicator shown in FIG. 33.

The process for displaying the indicator 61 will be explained in reference to FIG. 34. When a pen event occurs by a pen operation by the user (S201), the CPU 41 determines the tool force level obtained from the pen controller 57 and is set to the variable buffer 54 of the RAM 52 (S202).

Next, from the tool force information table of the RAM 52, the CPU 41 selects the color and sound corresponding to the tool force level, and sets them in the variable buffer 54 (S203). Then, it is determined whether or not the current tool force exceeds a permissible level for the hardware (S204). If so, a warning message "Do not press any harder." is displayed (S205). When a pen up event occurs (S206) after S205, a message is deleted (S207).

In S204, when the tool force is not more than a predetermined value (If NO in S204), the bit map of the frame of the indicator 61 (the portion excluding the pointer 62) is stored in the VRAM 44 (S208). Thereafter, the frame of the indicator 61 is displayed on the display screen (based on information indicative of a display position (S209).

Next, the current tool force level is compared with the tool force level when the routine was executed last time (S210). If the current tool force level is higher than the previous tool force level, a length of the pointer 62 in the indicator 61 is made longer by the increased amount of the previous tool force level, and outputs a beeping sound corresponding to the tool force level (S211). Here, the pointer 62 is displayed in color corresponding to the tool force level.

On the other hand, when the current tool force level is lower than the previous tool force level, the pointer 62 in the indicator 61 is cut off for an amount of reduction from the previous tool force level, and outputs a beeping sound corresponding to the tool force level. Here, the pointer 62 is displayed in color corresponding to the tool force level (S212).

An example of the tool force information table for setting the color, sound, etc., corresponding to the tool force level is shown below.

TABLE 1

Tool force Information Memory Table

| TOOL FORCE | LENGTH OF POINTER | COLOR | SOUND | DISPLAY SCALE | |
|---|---|---|---|---|---|
| X1 | 1 | PURPLE | DO | THIN | SOFT |
| X2 | 2 | BLUE | RE | THIN | SOFT |
| X3 | 3 | GREEN | MI | NORMAL | NORMAL |
| ... | | | | | |
| $X_{MAX}$ | 10 | YELLOW | SI | THICK | HARD |

Figure 35:
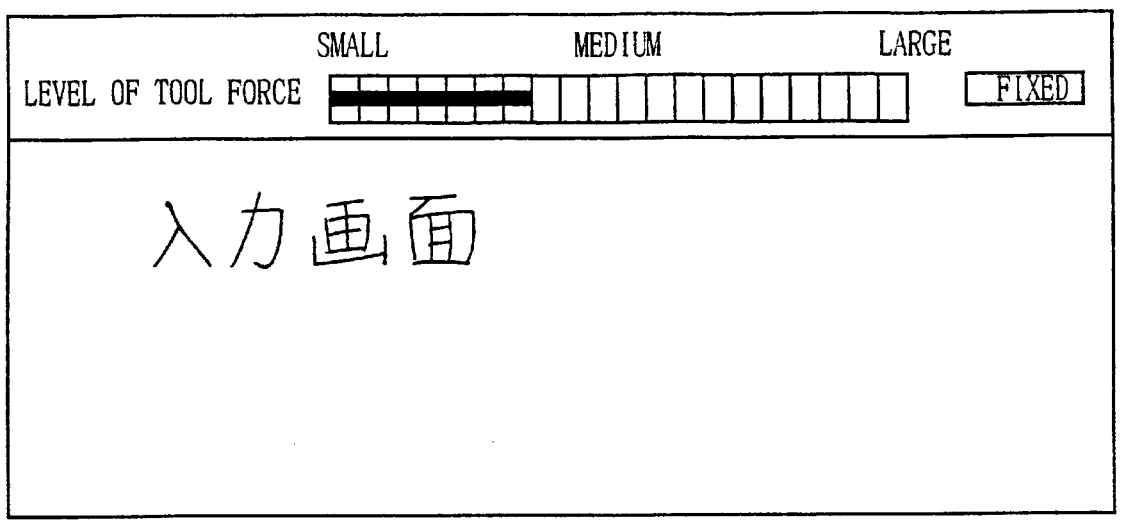
FIG. 35 is an explanatory view showing another example where an indicator is displayed on a display screen of the document processing device.

In FIG. 33, a scale "0" indicating the lower limit level of the tool force and a scale "MAX" indicating the upper limit level of the tool force are displayed above the indicator 61. However, it may be arranged so as to display the words indicative of the level of the tool force as scales as shown in FIG. 35. For example, in the case where the user selects the plotting function for graphics, etc., to display a line width according to the tool force applied by the user, the words "thin", "normal" and "thick" are displayed as scales.

TABLE 2

| FUNCTION | DISPLAY SCALE | | |
|---|---|---|---|
| PLOTTING INPUT | THIN SOFT | NORMAL NORMAL | THICK HARD |
| ... | ... | ... | ... |

Figure 36:
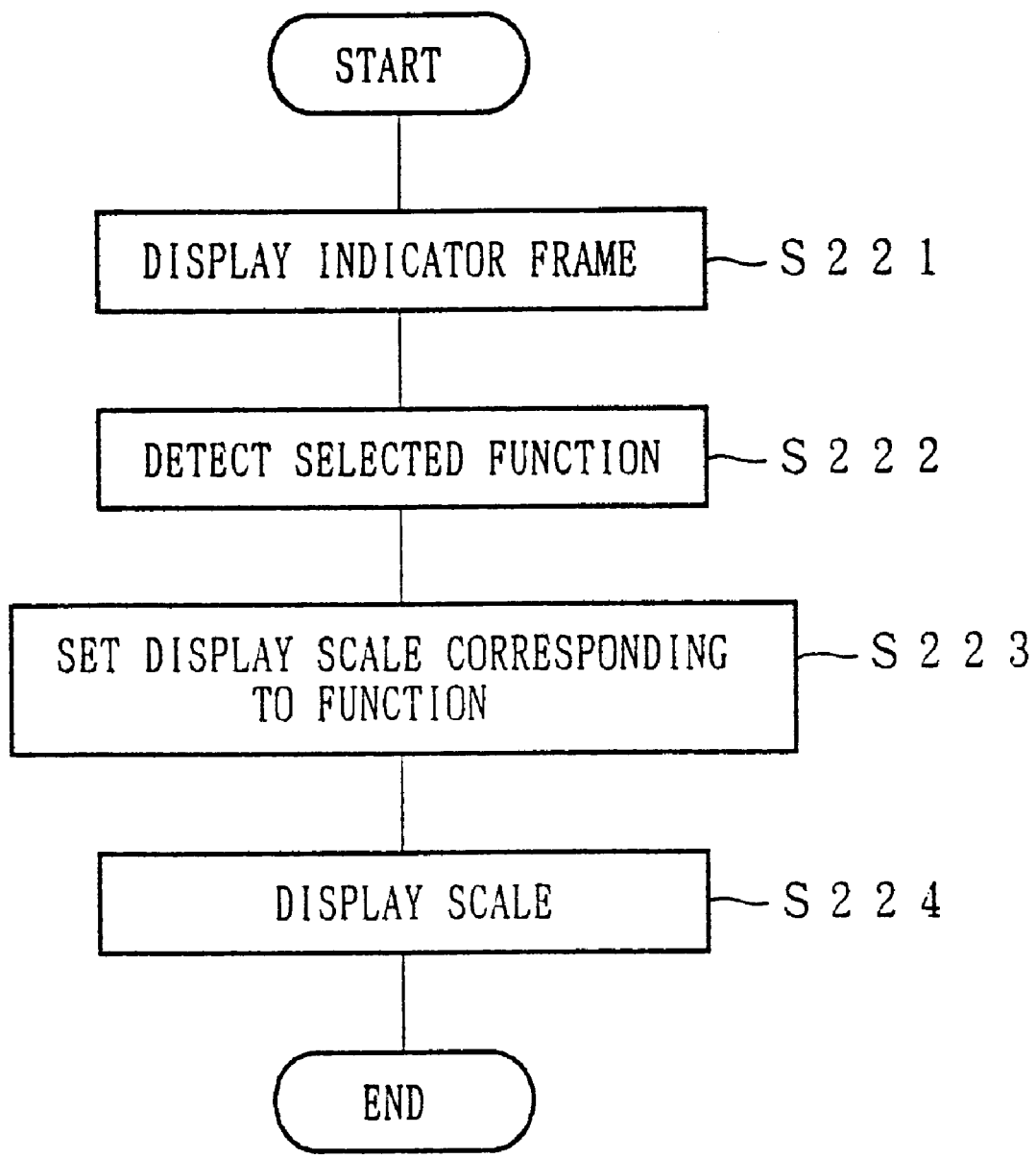
FIG. 36 is a flowchart showing a process of displaying an indicator as shown in FIG. 35.

The display process of the screen will be explained in reference to FIG. 36. First, the frame of the indicator 61 is displayed (S221). Then, it is detected which function is selected by the user (S222). Then, the display scale which corresponds to the detected function is set in the RAM 52 (S223), and the scale is displayed above the indicator 61 (S224).

In the document processing device, it may be arranged such that the indicator 61 is displayed on the screen of the display device 46 at any position as desired. Additionally, it may be arranged so as to allow the user to set a color of the pointer 62 of the indicator 61, a beeping sound corresponding to each level of the tool force, and a scale to be displayed for the indicator 61 as desired as shown in Table 1 or 2.

Figure 37:
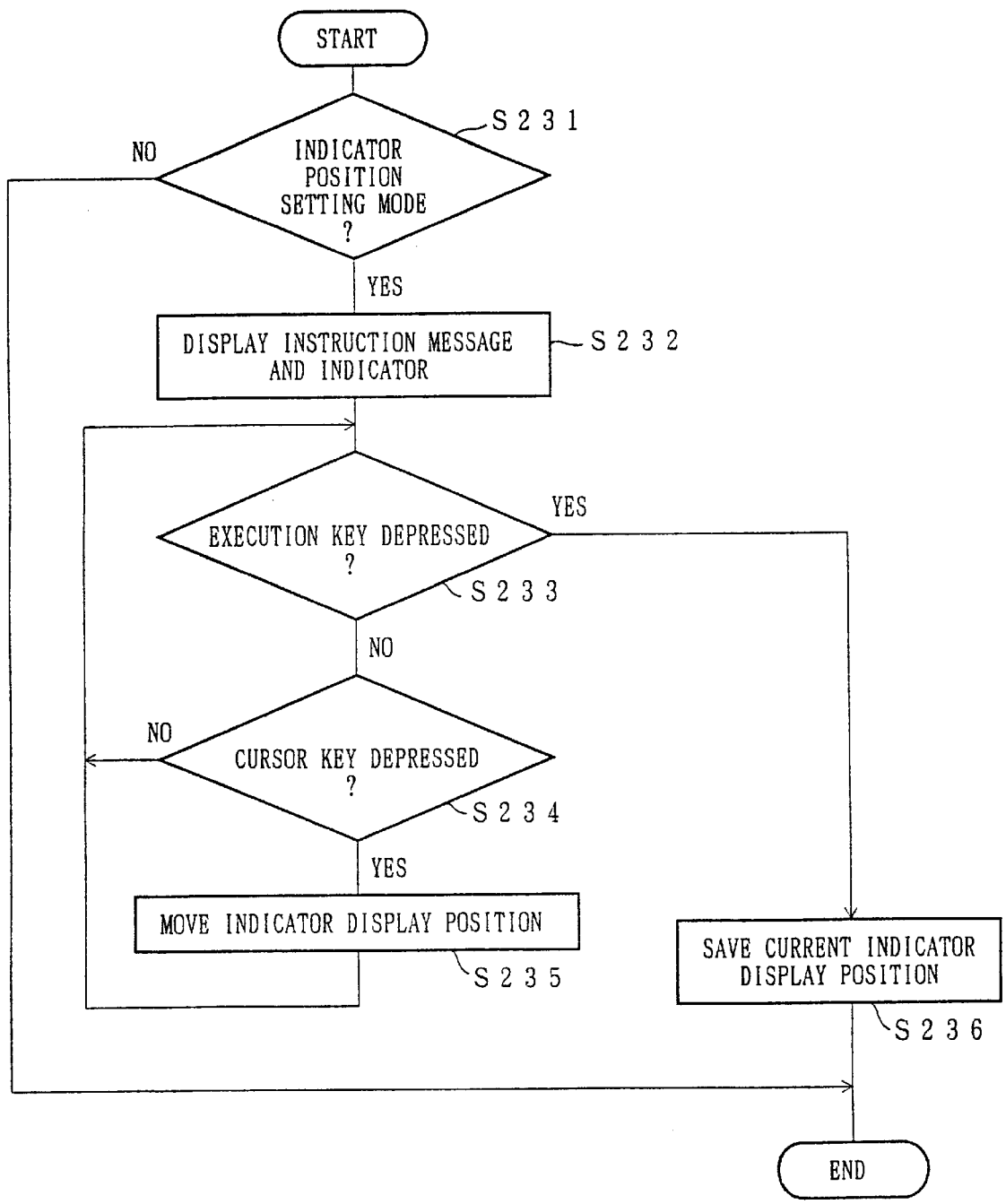
FIG. 37 is a flowchart showing a process of setting a display position of an indicator by the user.

The process of setting the display position of the indicator 61 will be explained in reference to FIG. 37. First, it is determined whether or not a pen event occurred is a selection of the display position setting mode of the indicator 61 (S231). Here, it may be arranged so as to allow the user to select the display position setting mode by a pen operation from the menu.

If the result of determination in S231 is YES, the indicator 61 is displayed at the currently set position with a message "Set a display position of the tool force indicator" (S232), and it is set in the input wait state. The user checks the displayed indicator 61, and if the indicator 61 is at a desired position, an execution key is depressed. On the other hand, if the user desires to move the position of the cursor from the current position, a cursor key is depressed.

Here, if the execution key is depressed (S233), the information indicative of the position of the indicator 61 which is currently displayed is stored in the RAM 52 (S236). On the other hand, if the cursor key is depressed, i.e., if YES in S234, the indicator 61 being displayed is moved according to the cursor operation (S235). Then, the sequence goes back to the input wait state.

Figure 38:
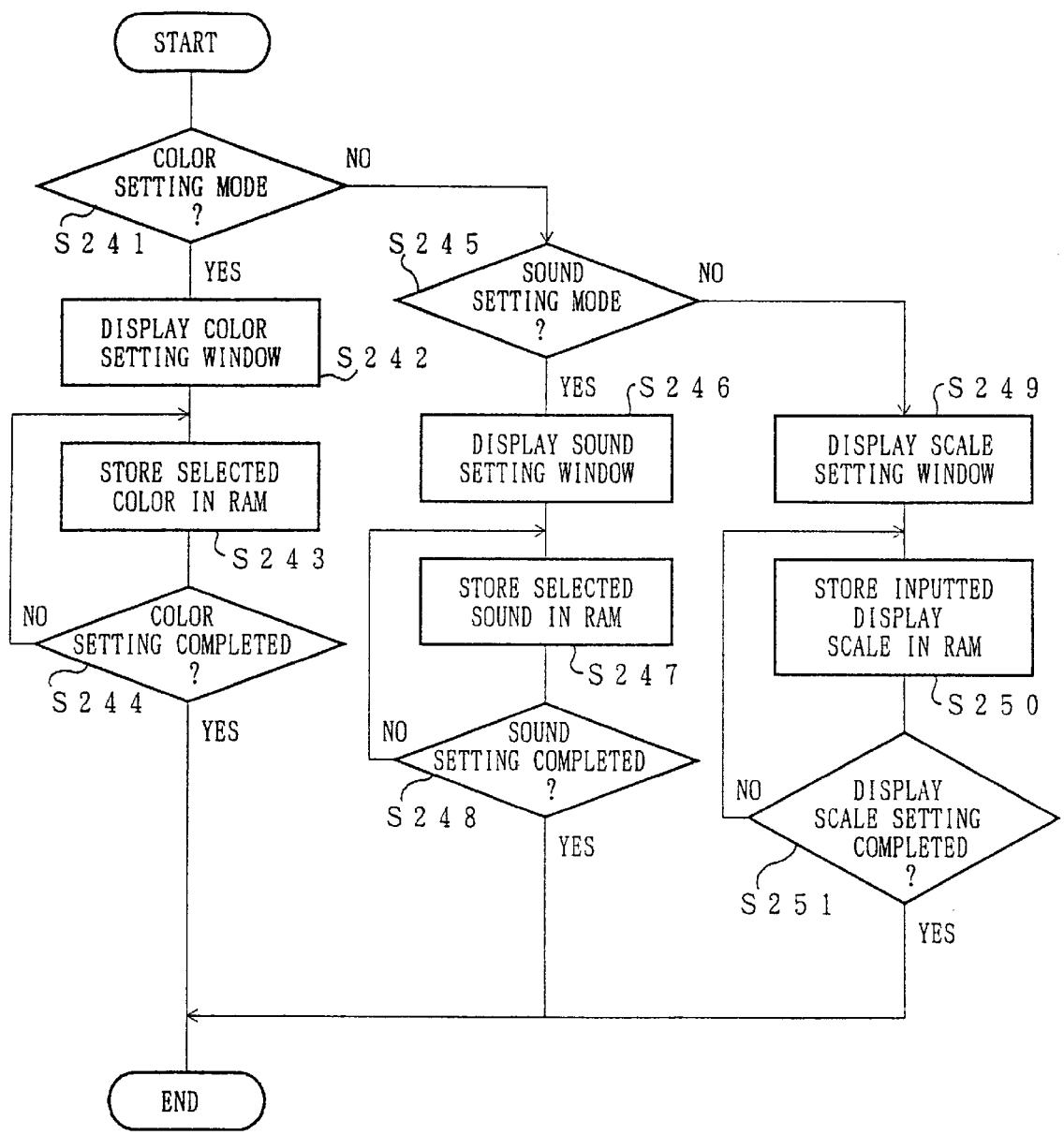
FIG. 38 is a flowchart showing a process of setting by the user a color of a pointer of an indicator, a sound to be outputted when a level of the tool force has changed or a display scale of the indicator as desired.

Next, the process of setting the color of the pointer 62 of the indicator 61, the beeping sound to be outputted when the level of the tool force has changed, and the display scale by the user on the upper portion of the indicator 61 will be explained in reference to FIG. 38.

Figure 39:
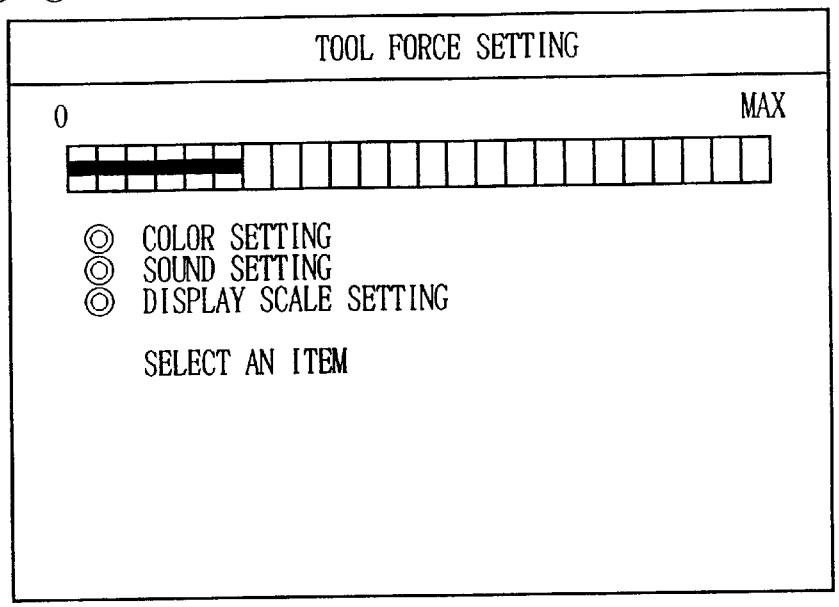
FIG. 39 is an explanatory view showing one example of a menu screen to be displayed in the process shown in the flowchart of FIG. 38.

The CPU 41 determines whether or not a pen event occurred is a selection of a color setting mode (S241). Here, the user can select a color setting mode from a selection screen by a pen operation as shown in FIG. 39.

Figure 40:
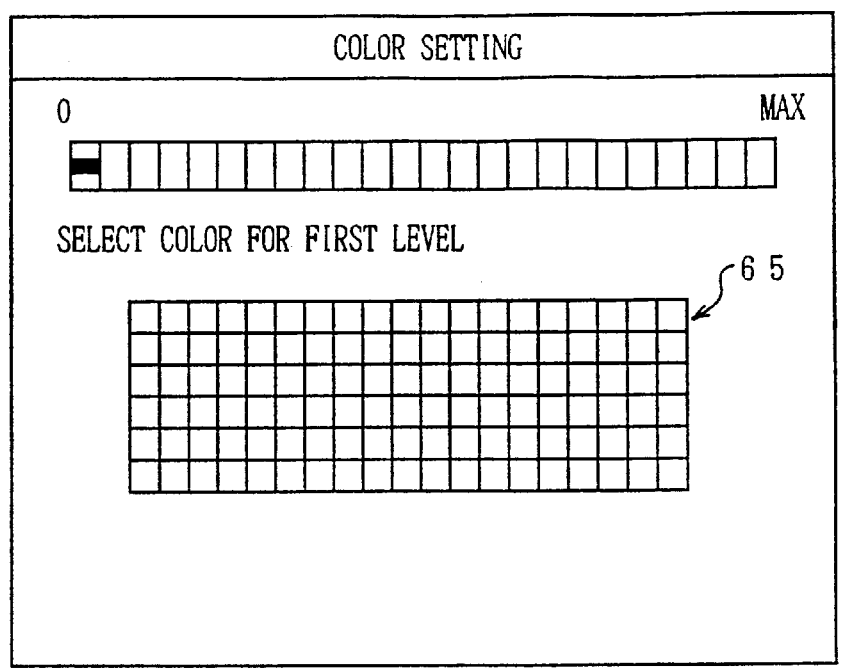
FIG. 40 is an explanatory view showing one example of a color setting screen to be displayed when a color of a pointer of the indicator is to be set by the user.

If the color setting mode is selected in S241, the CPU 41 displays a window for setting color as shown in FIG. 40 (S242). In the window for setting color, a prompting message is displayed together with a color palette 65 in which various colors are displayed. In FIG. 40, a prompting message for urging the user to set a color corresponding to the first level, i.e., the lowest level of the tool force is displayed. When the user selects a color as desired from the colors displayed in the color palette 65 by a pen operation, the selected color is stored in the RAM 52 so as to correspond to the level of the tool force (S243). Then, the CPU 41 determines whether or not the color setting for all the levels of the tool force has been completed (S244). If YES in S244, the described sequential process is terminated.

Figure 41:
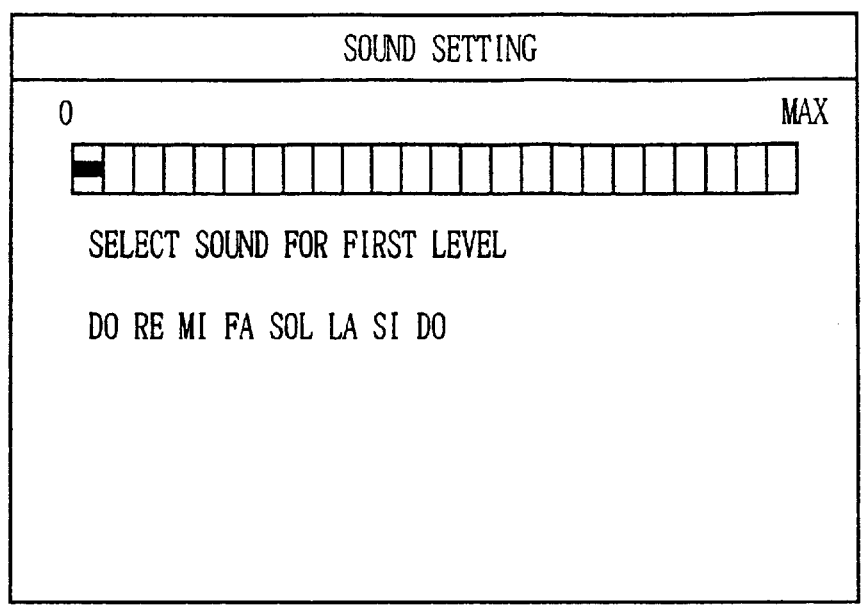
FIG. 41 is an explanatory view showing one example of a sound setting screen to be displayed when the user sets a sound to be outputted when the level of the tool force has changed.

If the selected mode is not a color setting mode in S241, it is determined whether or not the selected mode is a sound setting mode (S245). If so, a window for setting a sound shown in FIG. 41 is displayed (S246). Next, as in the case of the color setting mode, the user sets a sound for each level of the tool force, and the sound set by the user is stored in the RAM 52 (S247). Then, it is determined whether or not the setting of sound for all the levels of the tool force has been completed (S248). If so, a sequential process is terminated.

If the selected mode is not a sound setting mode in S245, then, a window for setting a display scale as shown in FIG. 42 is displayed (S249). Then, the user performs a setting of the display scale for each level of the tool force by means of the keyboard 56, etc. (S250). The scales may be displayed for all the levels of the tool force, or for only certain levels which are necessary. Then, it is determined whether or not the setting of scales has been completed (S251). If so, the described sequential process is terminated.

The described document processing device is arranged so as to detect the tool force applied through the pen 58*a* and performs a drawing process according to the detected tool force. However, by depressing the button 63 displayed on the screen shown in FIG. 33, etc., with the pen 58*a*, an operational mode can be switched to the fixed tool force mode. In the fixed tool force mode, the tool force applied through the pen 58*a* is not detected, and a plotting process is performed by assuming that a constant tool force is being applied. Therefore, the described feature is appreciated, for example, when the user desires to perform a plotting process, etc., with a constant line width as the need of maintaining the fixed tool force constant can be eliminated, thereby achieving an improved operability.

Figure 43:
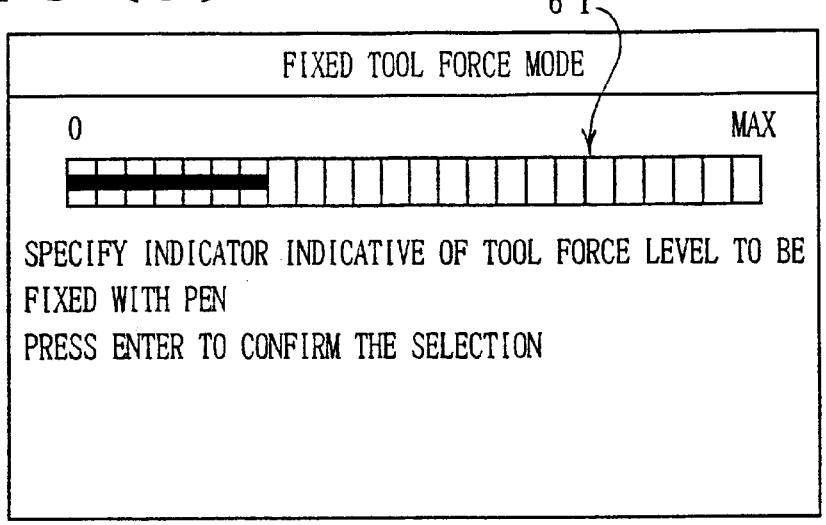
FIG. 43($a$) and FIG. 43($b$) are explanatory views showing one example of the screen to be displayed when the user sets a level of tool force to be fixed and an example screen to be displayed after the tool force is fixed.
Figure 43:
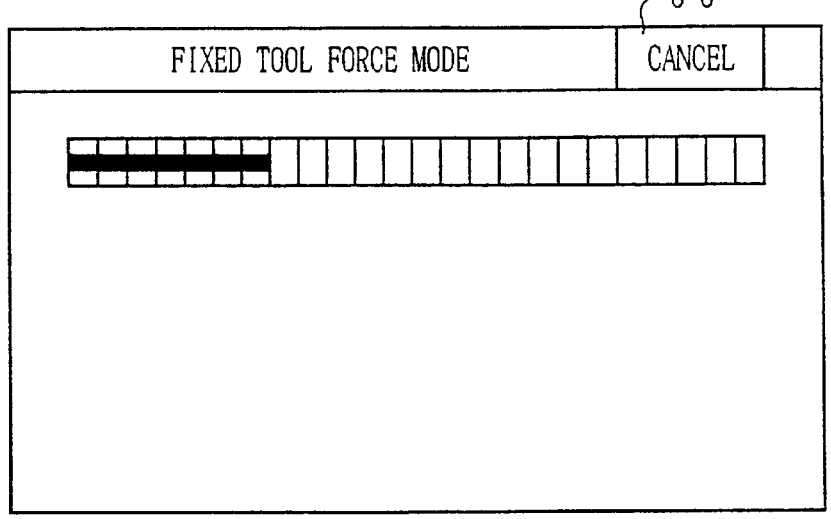

When the user presses the button 63 shown in FIG. 33, etc., a screen of the fixed tool force mode is displayed as shown in FIG. 43(*a*). Then, the user specifies the level of the tool force with the pen 58*a* as desired in the indicator 61 displayed on the screen, and specifies to which level the tool force is fixed by depressing the execution key. Namely, the button 63 corresponds to the fixed tool force mode setting device 118 shown in FIG. 29.

After the operational mode is set to the fixed tool force mode, as shown in FIG. 43(*b*), the cancellation button 66 is displayed on the right upper portion of the screen. Then, when the user desires to cancel the fixed tool force mode, the cancellation button 66 is depressed with the pen 58*a*. Here, the cancellation button 66 corresponds to the fixed tool force mode cancelling unit 119 shown in FIG. 29.

The described document processing device permits a part of the document to be displayed in a larger scale in another window for editing therein the document. The described window is hereinafter referred to as an observation window. As shown in FIG. 44(*a*), the display device 46 displays an entire image 67 of the document, and the observation window 68 for displaying therein a part of the entire image 67 in a larger scale in alignment. In the entire image 67, a border line 69 indicating a circumference of the area to be displayed in the screen 68 is displayed. As a result, which portion of the entire image 67 is displayed in the observation window 68 can be seen by the user at a glance.

The process of moving the border in the observation window 68 by the user will be explained. The user specifies, for example, a triangular border 81 with a pen 58*a*, that is displayed within the observation window 68, and the pen 58*a* is moved to the right by dragging at a tool force of not more than a predetermined value. As a result, only the triangular border 81 is moved to the right within the observation window 68 (fixed screen mode). In this case, which portion of the image 67 is displayed in the observation window 68 does not vary.

On the other hand, the user specifies the triangular border 81 with the pen 58*a* as in the described manner, and the border 81 is dragged to the right at a tool force greater than the predetermined value. Then, the screen in the observation window 68 is scrolled with the movement of the border 81 (scroll mode). As is clear from the border line 69 shown on the right hand side in FIG. 44(*b*), the part of the image 67 displayed in the observation window 68 is also moved to the right.

Figure 45:
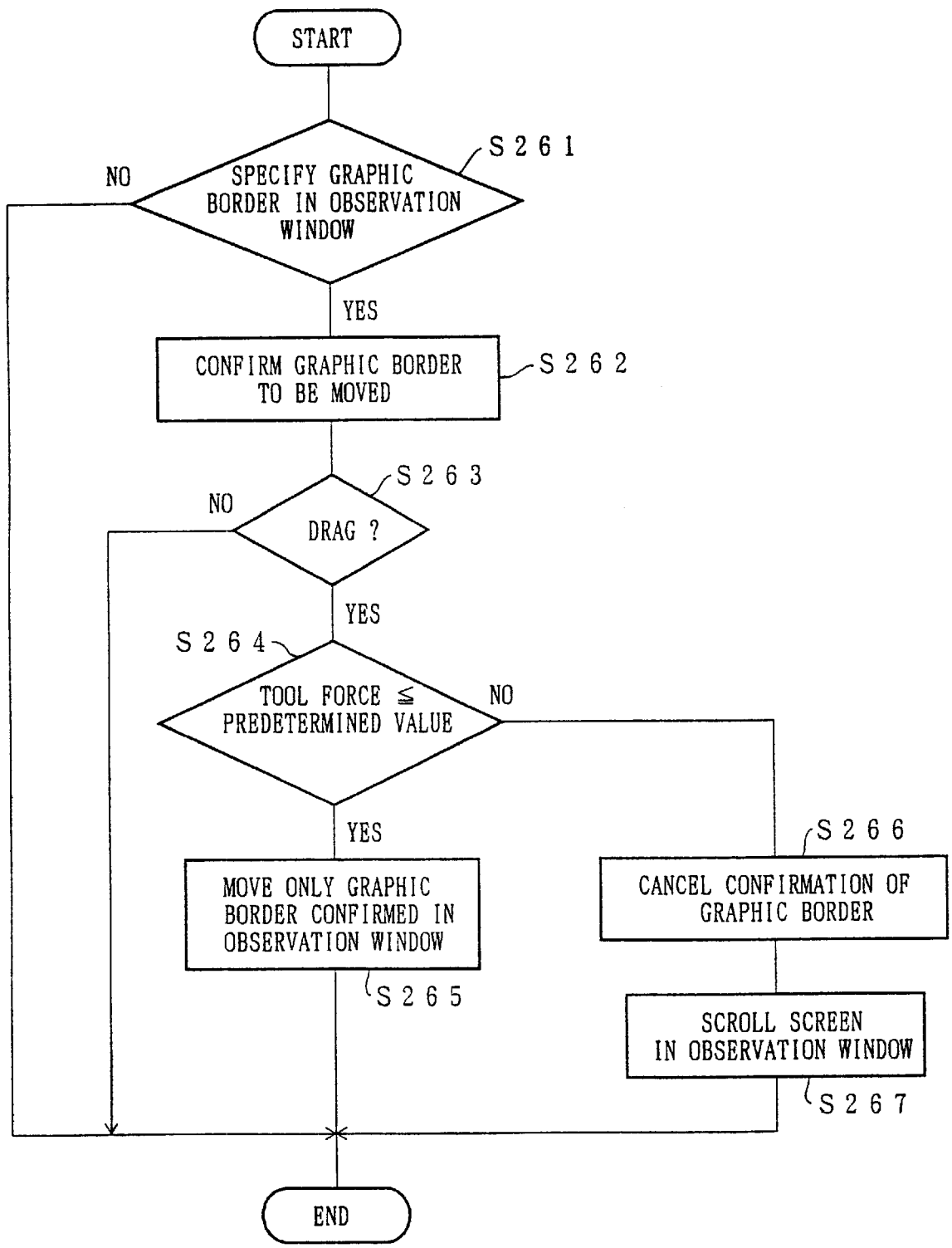
FIG. 45 is a flowchart showing the process of moving the graphic border shown in FIG. 44($a$) and FIG. 44($b$).

The process of moving a graphic border will be explained in reference to FIG. 45. First, the CPU 41 determines whether or not the pen event occurred is a graphic border specification in the observation window 68 (S264). Namely, it is determined whether or not the point depressed with the pen 58*a* is within the graphic border in the observation window 68. If so, the graphic border is confirmed (S262).

Then, it is determined whether or not the dragging operation with the pen 58*a* is performed by the user (S263). If so, the tool force on this occasion is compared with the predetermined value (S264). If the tool force is not larger than the predetermined value, the operational mode is determined to be the fixed screen mode, and only the graphic border confirmed in the observation window 68 is moved (S265). On the other hand, if the tool force is larger than the predetermined value, the operational mode is determined to be the scroll mode, and the confirmation of the graphic border is cancelled (S266), and the screen is scrolled in the observation window 68 (S267).

As described, in the document processing device, only by adjusting the tool force applied by the user with the pen 58*a*, whether or not the portion displayed in the observation window 68 is to be scrolled can be controlled.

Figure 46:
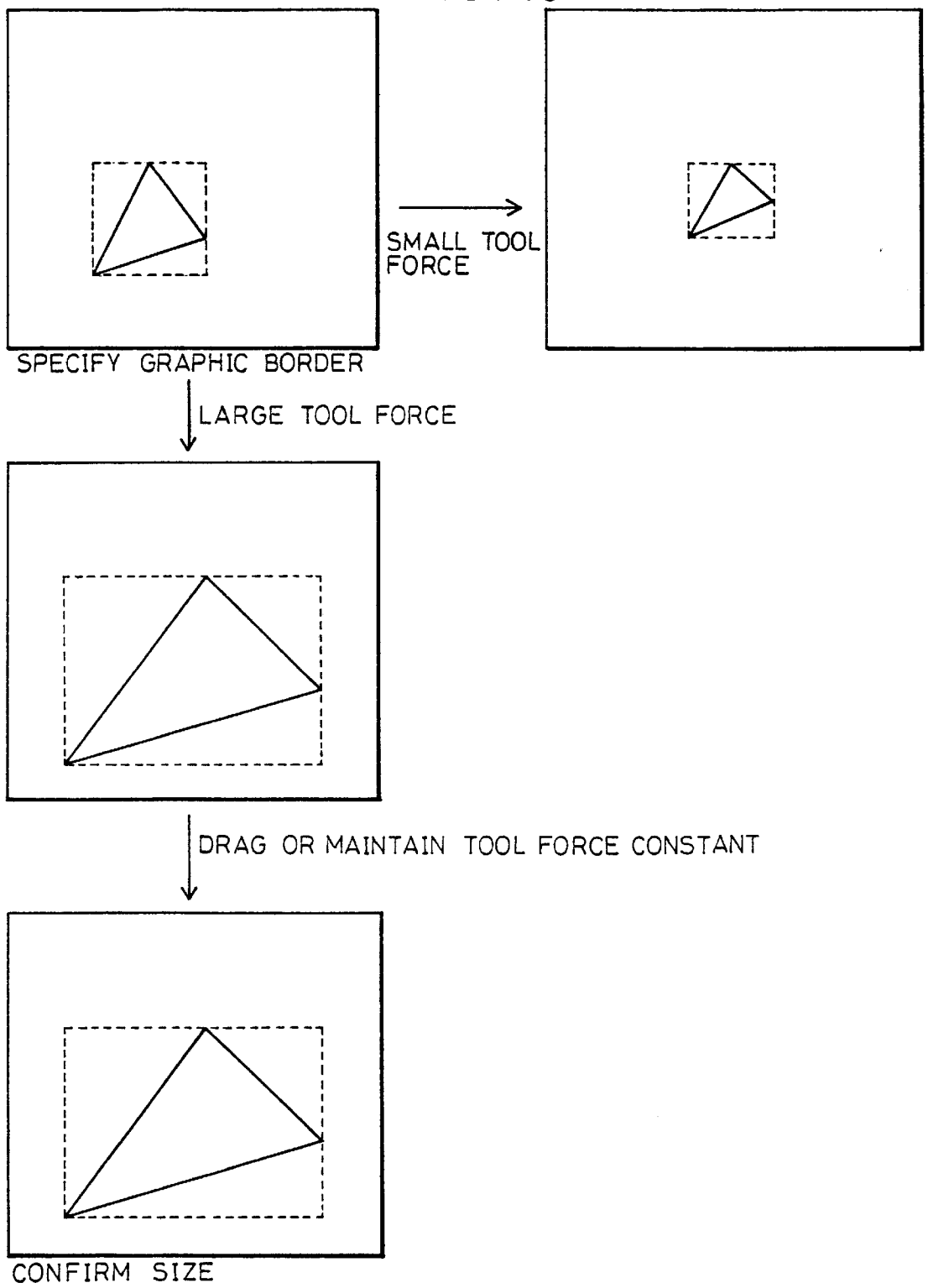
FIG. 46 is an explanatory view showing a state where a graphic border is scaled.

In the described document processing device, only by adjusting the tool force applied by the user with the pen 58*a* in the observation window 68, a scaling of the graphic border, etc., can be performed. Specifically, the border to be scaled is specified with the pen 58*a* as shown in FIG. 46.

Then, the user keeps pressing the same point with the pen 58a at a tool force lower than a predetermined value (neutral value), then the reduction of the border size starts. On the other hand, when the user keeps pressing the same portion with the pen 58a at a tool force larger than the neutral value, the enlargement of the border size starts. Furthermore, when the user drags with the pen 58a or holds the pen 58a at a constant tool force for a predetermined elapsed time, the current border size is confirmed.

Figure 47:
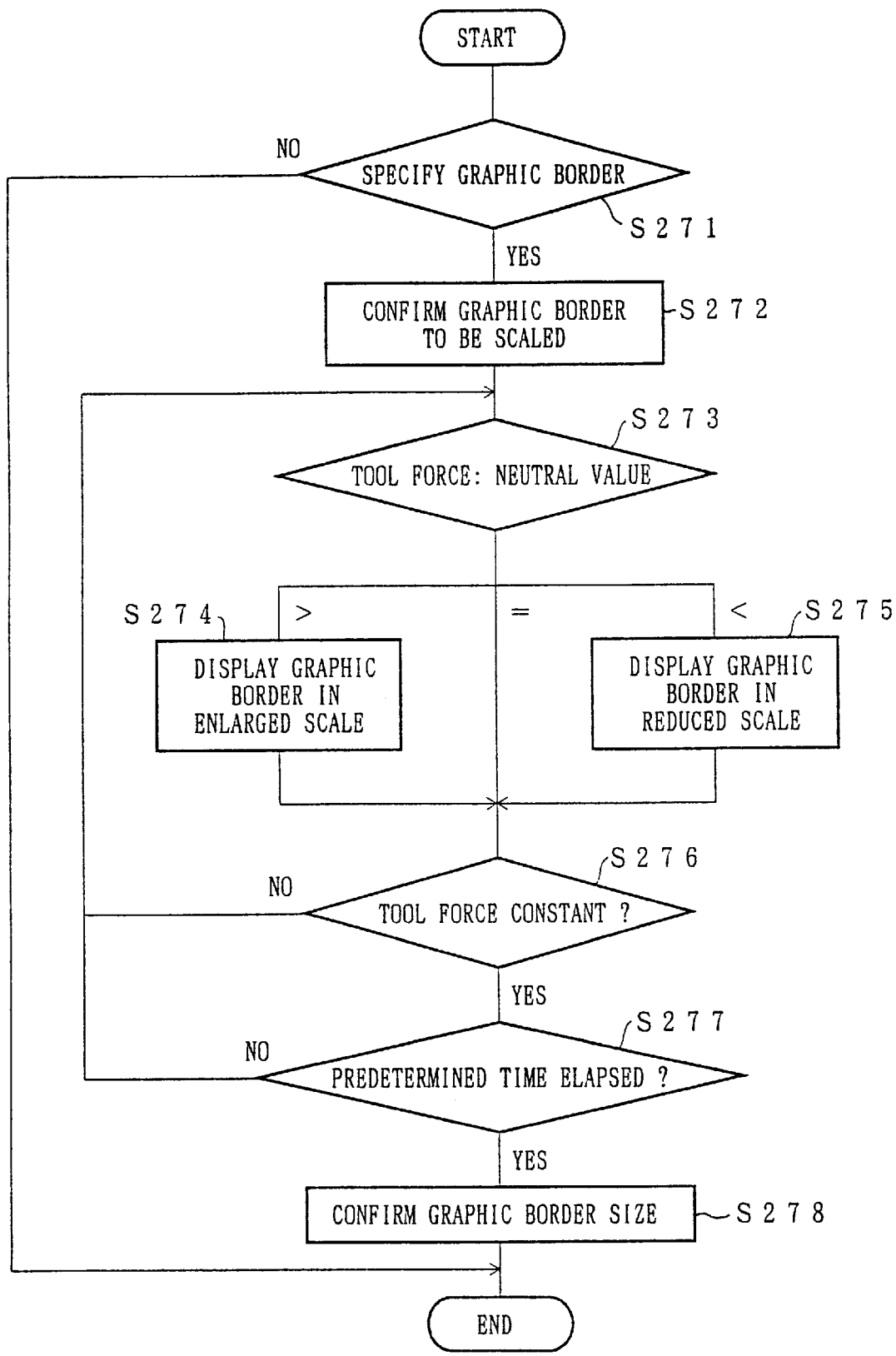
FIG. 47 is a flowchart showing the process of scaling the graphic border shown in FIG. 46.

The scaling of the border will be explained in reference to FIG. 47. In a graphic editing screen shown in FIG. 44(a) or FIG. 44(b), the CPU 41 determines whether or not the point pressed with the pen 58a is on the graphic border (S271). If so in S271, the CPU 41 confirms the graphic border to be edited (S272). Further, the CPU 41 determines whether or not a tool force on this occasion is greater than the predetermined value (neutral value) (S273). If the tool force on this occasion is greater than the predetermined value, the size of the graphic border to be displayed on the graphic editing screen is gradually enlarged (S274). On the other hand, if the tool force on this occasion is smaller than the predetermined value, the size of the graphic border to be displayed on the graphic editing screen is gradually reduced (S275).

Then, it is determined whether or not a constant tool force is being applied (S276). If so in S276, it is determined whether or not a predetermined time has elapsed after the application of the constat tool force is started (S277). If the result of determination in S276 or S277 is YES, the current border size is conformed (S278).

As described, the described document processing device permits the graphic border to be scaled with ease only by adjusting the tool force applied by the user with the pen 58a.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A document processing device, comprising:
   pointing means for allowing a user to specify a coordinate by applying thereon a tool force;
   coordinate detection means for detecting a coordinate specified by said pointing means;
   tool force detection means for detecting a tool force at a time the coordinate is specified;
   display means; and
   plotting means for plotting an image in said display means at a position corresponding to a coordinate detected by said coordinate detection means in an operational mode of either a variable mode in which a plotting process is performed according to a tool force detected by said tool force detection means or a fixed mode in which a plotting process is performed according to a predetermined constant tool force, and
   operational mode switch means for switching the operational mode of said plotting means between the variable mode and the fixed mode based on a change in at least one of the coordinate detected by said coordinate detection means and the tool force detected by said tool force detection means.

2. The document processing device as set forth in claim 1, further comprising:
   time measuring means for measuring an elapsed time,
   wherein the operational mode of said plotting means is switched when an amount of change in tool force is not more than a predetermined value within a predetermined elapsed time measured by said time measuring means, and an amount of change in coordinate is not more than a predetermined value within a predetermined elapsed time measured by said time measuring means.

3. The document processing device as set forth in claim 1, wherein:
   the operational mode of said plotting means is set to the fixed mode when a detected amount of change in tool force is not more than a predetermined value during a period till an amount of change in coordinate reaches a predetermined value.

4. The document processing device as set forth in claim 1, further comprising:
   informing means for informing the user that the operational mode of said plotting means has changed.

5. The document processing device as set forth in claim 1, wherein:
   the operational mode of said plotting means is switched from the fixed mode to the variable mode when the tool force becomes not more than a predetermined value.

6. The document processing device as set forth in claim 1, wherein:
   the operational mode of said plotting means is switched from the fixed mode to the variable mode when a predetermined time has elapsed after the tool force becomes not more than a predetermined value.

7. The document processing device as set forth in claim 1, further comprising:
   time measuring means for measuring an elapsed time,
   wherein the operational mode of said plotting means is switched from the fixed mode to the variable mode when an amount of change in tool force reaches a predetermined value within a predetermined elapsed time measured by said time measuring means and an amount of change in coordinate is not more than a predetermined value during a period from said time measuring means starts measuring of an elapsed time till the amount of change in tool force reaches the predetermined value.

8. The document processing device as set forth in claim 1, further comprising:
   cursor display means for displaying a cursor according to a tool force in said display means,
   wherein said cursor display means displays a cursor which permits an identification of the fixed mode when the operational mode of said plotting means is the fixed mode.

9. A document processing device, comprising:
   pointing means for allowing a user to specify a coordinate by applying thereon a tool force;
   coordinate detection means for detecting a coordinate specified by said pointing means;

tool force detection means for detecting a tool force at a time the coordinate is specified;

display means;

plotting means for plotting an image in said display means at a position corresponding to a coordinated detected by said coordinate detection means; in an operational mode of either a variable mode in which a plotting process is performed according to a tool force detected by said tool force detection means or a fixed mode in which a plotting process is performed according to a predetermined constant tool force, and operational mode switch means for switching the operational mode of said plotting means between the variable mode and the fixed mode based on a chance in at least one of the coordinate detected by said coordinate detection means and the tool force detected by said tool force detection means; and tool force display means for displaying an indicator indicative of a tool force detected by said tool force detection means.

10. A document processing device comprising:

pointing means for allowing a user to specify a coordinate by applying thereon a tool force;

coordinate detection means for detecting a coordinate specified by said pointing means;

tool force detection means for detecting a tool force at a time the coordinate is specified;

display means;

plotting means for allowing an image in said display means at a position corresponding to a coordinate detected by said coordinate detection means;

tool force display means for displaying an indicator indicative of a tool force detected by said tool force detection means;

sound memory means for storing a sound corresponding to a level of a tool force detected by said tool force detection means; and sound output means for receiving a sound corresponding to a tool force applied by the user from said sound memory means and outputting the sound when a level of the tool force applied by the user has changed.

11. The document-processing device as set forth in claim 10 further comprising:

color memory means for storing a color according to a level of tool force detected by said tool force detection means, wherein said tool force display means takes in a color corresponding to the tool force applied by the user from said color memory means and displays a pointer of the indicator in the color.

12. The document processing device as set forth in claim 11, further comprising:

color setting means for setting a color corresponding to each level of tool force by the user.

13. The document processing device as set forth in claim 10, further comprising:

sound setting means for setting a sound corresponding to each level of the tool force by the user.

14. A document processing device, comprising:

pointing means for allowing a user to specify a coordinate by applying thereon a tool force;

coordinate detection means for detecting a coordinate specified by said pointing means;

tool force detection means for detecting a tool force at a time the coordinate is specified;

display means;

plotting means for plotting an image in said display means at a position corresponding to a coordinate detected by said coordinate detection means;

tool force display means for displaying an indicator indicative of a tool force detected by said tool force detection means;

function determination means for determining a function selected by the user; and display scale memory means for storing therein a display scale corresponding to each function, wherein said tool force display means receives a display scale of an indicator from said display scale memory means, which corresponds to a function selected by the user, and displays the display scale.

15. The document processing device as set forth in claim 14, further comprising:

display scale setting means for setting a display scale corresponding to each function by the user.

16. The document-processing device as set forth in claim 10 further comprising:

display position memory means for storing a position at which the indicator is displayed; and display position setting means for setting a display position of the indicator by the user.

17. The document-processing device as set forth in claim 10, further comprising:

warning means which outputs a warning message when a tool force detected by said tool force detection means reaches a predetermined value.

18. A document processing device, comprising:

pointing means for allowing a user to specify a coordinate by applying thereon a tool force;

coordinate detection means for detecting a coordinate specified by said pointing means;

tool force detection means for detecting a tool force at a time the coordinate is specified;

display means for displaying an entire image of a document to be processed and an observation window for displaying a part of the entire image in a larger scale on a same screen simultaneously; and mode determination means for determining based on a change in coordinate and tool force whether only a border specified in a portion displayed in the observation window is moved or the portion displayed in the observation window is moved.

* * * * *